(12) United States Patent
Malik

(10) Patent No.: US 7,606,840 B2
(45) Date of Patent: Oct. 20, 2009

(54) VERSION CONTROL IN A DISTRIBUTED COMPUTING ENVIRONMENT

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 327 days.

(21) Appl. No.: 10/868,369

(22) Filed: Jun. 15, 2004

(65) Prior Publication Data

US 2006/0010103 A1    Jan. 12, 2006

(51) Int. Cl.
*G06F 17/30* (2006.01)
*G06F 12/00* (2006.01)

(52) U.S. Cl. .............................. 707/203; 707/3; 726/22
(58) Field of Classification Search ...................... None
See application file for complete search history.

(56) References Cited

U.S. PATENT DOCUMENTS

| | | | |
|---|---|---|---|
| 5,167,016 A * | 11/1992 | Bagley et al. | ............... 715/210 |
| 6,226,412 B1 | 5/2001 | Schwab | |
| 6,442,576 B1 | 8/2002 | Edelman et al. | |
| 6,601,108 B1 | 7/2003 | Marmor | |
| 6,651,087 B1 | 11/2003 | Dennis | |
| 6,771,286 B2 | 8/2004 | Emrani | |
| 6,938,170 B1 * | 8/2005 | Kraft et al. | ..................... 726/23 |
| 6,944,822 B1 | 9/2005 | Schreiber et al. | |
| 6,952,802 B2 | 10/2005 | Hardy | |
| 7,000,186 B1 | 2/2006 | Gropper et al. | |
| 7,475,341 B2 | 1/2009 | Malik | |
| 2002/0146159 A1* | 10/2002 | Nolte | .......................... 382/128 |
| 2003/0033432 A1 | 2/2003 | Simpson et al. | |
| 2004/0078318 A1 | 4/2004 | Miller | |
| 2004/0117734 A1 | 6/2004 | Krickhahn | |
| 2006/0129627 A1* | 6/2006 | Phillips et al. | ............... 709/200 |
| 2006/0143307 A1* | 6/2006 | Codignotto | .................. 709/246 |

FOREIGN PATENT DOCUMENTS

EP    434930 A2    3/1991

OTHER PUBLICATIONS

"What is PDF?", Adobe Systems Inc., downloaded from http://web.archive.org/web/20040202183457/http://www.adobe.com/products/acrobat/adobepdf.html, archived to Feb. 2004, pp 1-5.
Malik; Examiner Interview Summary Record mailed Jan. 16, 2008; U.S. Appl. No. 10/686,233 filed Jun. 15, 2004.

(Continued)

*Primary Examiner*—Charles Rones
*Assistant Examiner*—Alicia M Lewis
(74) *Attorney, Agent, or Firm*—Thomas, Kayden, Horstemeyer & Risley, LLP

(57) ABSTRACT

The present disclosure provides systems and methods for maintaining and controlling different versions of electronic files in a distributed server environment. As such, one embodiment, among others, accesses a local file and compares the local file to a master file. The local file has a local file identifier, which comprises a name portion and a version number portion. The master file has a master file identifier, which comprises a name portion and a version number portion. The name portion of the master file identifier is substantially identical to the name portion of the local file identifier.

20 Claims, 18 Drawing Sheets

OTHER PUBLICATIONS

Malik; Non- Final Rejection mailed Jan. 10, 2008; U.S. Appl. No. 10/868,558 filed Jun. 15, 2004.
Malik; Non-Final Rejection mailed Apr. 14, 2008 for U.S. Appl. No. 10/868,233 filed Jun. 15, 2004.
Malik; Notice of Allowance and Fees Due mailed Sep. 23, 2008 for U.S. Appl. No. 10/868,233 filed Jun. 15, 2004.
Malik; Final Rejection mailed Jun. 16, 2008 for U.S. Appl. No. 10/868,558 filed Jun. 15, 2004.
Probets, "Hypermdeica and Graphics 2: Vector Graphics: From Post SCript and Flash to SVG", Proceedings of the 2001 ACM Symposium on Document Engineering DocEng '01; pp. 135-143.
Bagley; Creating Reusable Well-Structured PDF as a Sequence of Component Object Graphic (COG) Elements, Proceedings of the 2003 ACM Symposium on Document Engineering DocEng '03, pp. 58-67.
Malik; U.S. Appl. No. 10/868,233 filed Jun. 15, 2004.
Malik; U.S. Appl. No. 10/868,558 filed Jun. 15, 2004.
Malik; Non- Final Rejection mailed Jun. 14, 2007; U.S. Appl. No. 10/868,233 filed Jun. 15, 2004.
Malik; Final Rejection mailed Nov. 14, 2007; U.S. Appl. No. 10/868,233 filed Jun. 15, 2004.
Malik; Non- Final Rejection mailed Jul. 9, 2007; U.S. Appl. No. 10/868,558 filed Jun. 15, 2004.
Malik; Examiner Interview Summary Record mailed Sep. 13, 2007; U.S. Appl. No. 10/868,558 filed Jun. 15, 2004.
Malik; Final Rejection mailed Oct. 15, 2007; U.S. Appl. No. 10/868,558 filed Jun. 15, 2004.
Malik; Examiner Interview Summary Record mailed Nov. 26, 2007; U.S. Appl. No. 10/868,558 filed Jun. 15, 2004.

* cited by examiner

510 — Bob Smith: Professional Ditch-Digger.

If you need a hole dug in your yard, Bob is the man to do it. You can reach Bob at bsmith@bob.smith.com or by phone at (404) 555-1234. 530

520

Free estimates and references available upon request.

Bob Smith
123 Peachtree Street
Atlanta, GA 30303
540

Bob Smith: Professional Ditch-Digger.

If you need a hole dug in your yard, Bob is the man to do it. You can reach Bob at bsmith@bob.smith.com or by phone at (404) 555-1234.

Free estimates and references available upon request.

Bob Smith
123 Peachtree Street
Atlanta, GA 30303

FIG. 6A

Bob Smith: Professional Ditch-Digger.
― 612a

If you need a hole dug in your yard, Bob is the man to do it. You can reach Bob at bsmith@bob.smith.com ― 632 or by phone at (404) 555-1234.
― 622

Free estimates and references available upon request.

Bob Smith ― 612b
123 Peachtree Street ― 642
Atlanta, GA 30303

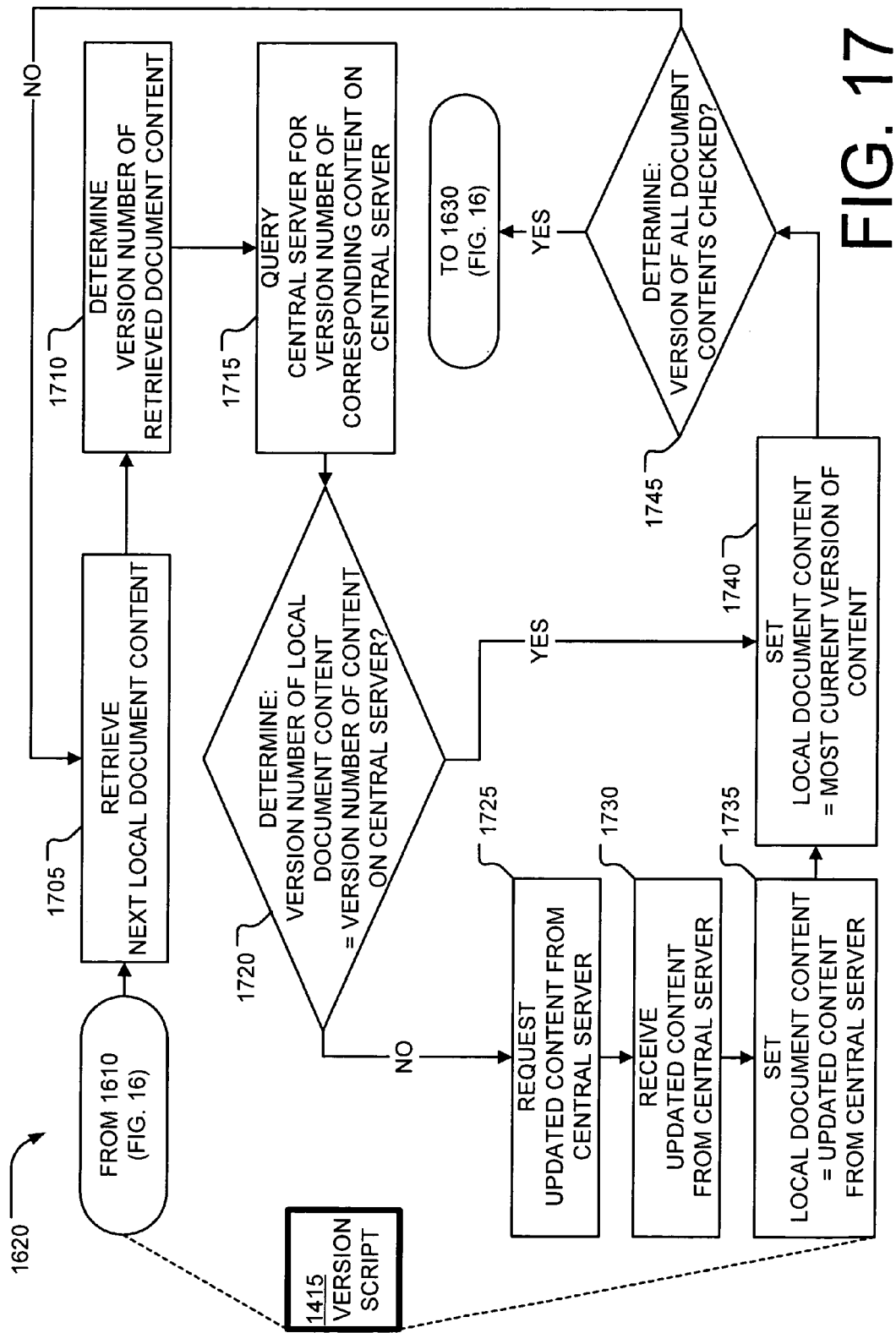

VERSION CONTROL IN A DISTRIBUTED COMPUTING ENVIRONMENT

CROSS REFERENCE TO RELATED APPLICATIONS

The present disclosure is related to the following co-pending U.S. patent applications: U.S. patent application Ser. No. 10/868,233, filed on Jun. 15, 2004, and having the title "Converting the Format of a Portion of an Electronic Document;" and U.S. patent application Ser. No. 10/868,558, filed on Jun. 15, 2004, and having the title "Editing an Image Representation of a Text." Those applications are incorporated by reference as if set forth in their entireties.

FIELD OF THE DISCLOSURE

The present disclosure relates generally to computing and, more particularly, to distributed computing.

BACKGROUND

Typically, in distributed server environments, many different physical servers contain duplicate information, thereby permitting large numbers of clients to access the same information from different servers. Often, this is accomplished by directing each query to a different server in a round-robin fashion. This type of distributed server environment provides faster access to data, since much of the processing and network traffic is distributed to many different servers.

Generally, the distributed servers are updated by pushing information to each of the servers. In other words, if the contents of the servers need to be updated, then the new contents are often uploaded to each of the servers from a central repository. Unfortunately, when a vast number of servers need to be updated concurrently, the bandwidth is occupied during the time of update, thereby slowing network traffic. In view of this deficiency, a need exists in the industry for controlling and maintaining information in distributed server environments.

SUMMARY

The present disclosure provides systems and methods for maintaining and controlling different versions of electronic files in a distributed server environment. As such, one embodiment, among others, accesses a local file and compares the local file to a master file. The local file has a local file identifier, which comprises a name portion and a version number portion. The master file has a master file identifier, which comprises a name portion and a version number portion. The name portion of the master file identifier is substantially identical to the name portion of the local file identifier.

Other systems, devices, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 illustrates an exemplary embodiment of a web page that is rendered with sensitive information included in searchable text.

FIG. 6A illustrates an exemplary embodiment of the web page of FIG. 5, which has been rendered with the sensitive information reformatted into an unsearchable format.

FIG. 6B illustrates another exemplary embodiment of the web page of FIG. 5, which has been rendered with the sensitive information reformatted into an unsearchable format.

FIG. 17 is a flowchart showing, in greater detail, the execution of the version script from FIG. 16, according to an exemplary embodiment

DETAILED DESCRIPTION OF EXEMPLARY EMBODIMENTS

Figure 1:
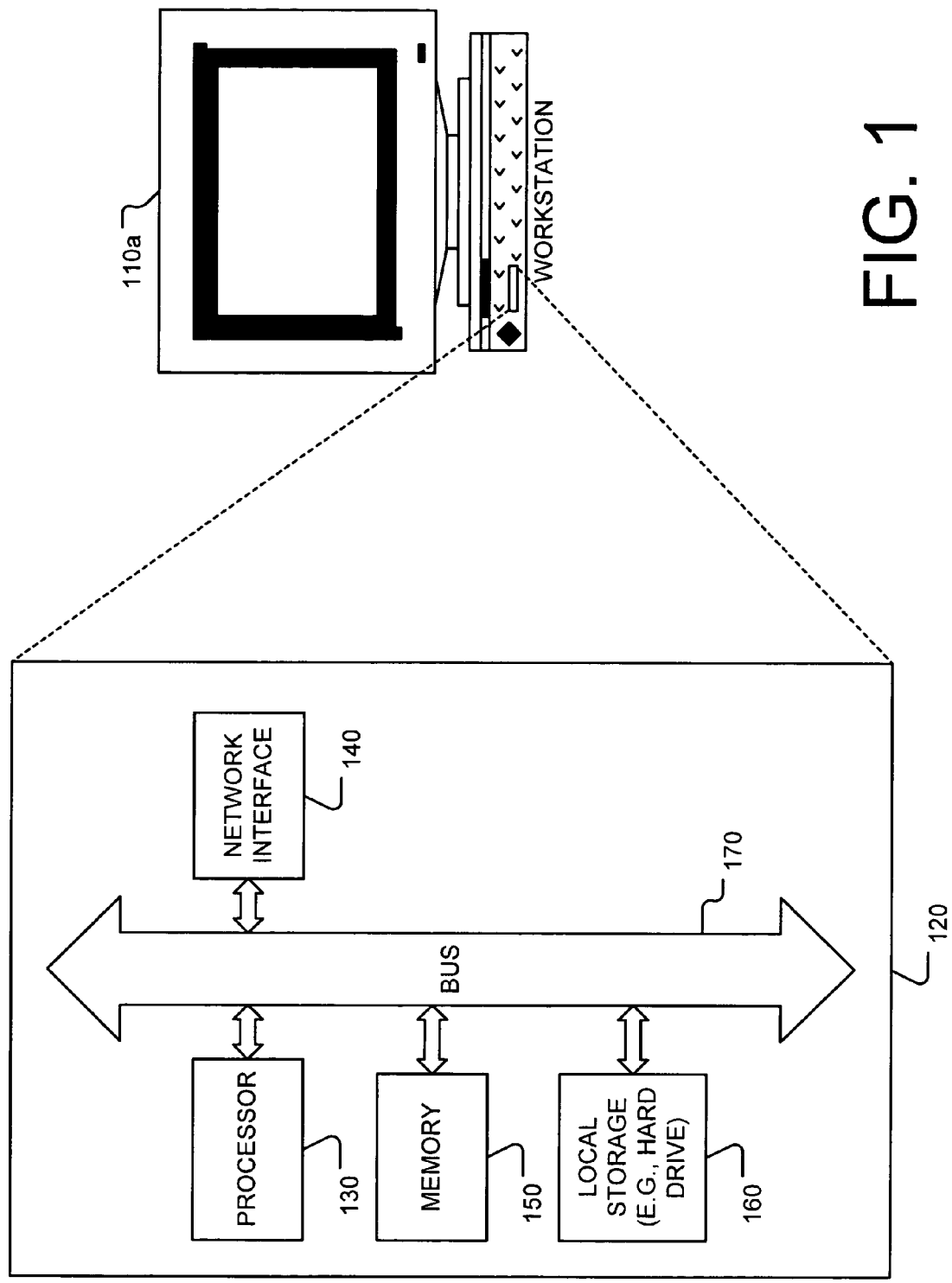
FIG. 1 is a block diagram showing an exemplary embodiment of a system for converting the format of a portion of a document.

Reference is now made in detail to the description of exemplary embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

As noted above, spammers and other individuals often harvest personal information from the Internet by using bots that trawl the Internet for personal information. The disclosed systems and methods seek to remedy this and other problems by reformatting searchable text within a document into a generally unsearchable (or substantially unsearchable) format, thereby preventing bots from easily identifying personal information. While images may be searched by performing an optical character recognition or similar operation, the term "unsearchable" is used herein to infer difficulty of search.

In accordance with one embodiment, among others, various identification criteria are established to identify sensitive information, such as, for example, an individual's name, email address, telephone number, social security number, etc. Using the established criteria, the searchable segments of an electronic document are identified. Upon identifying various searchable segments that match the identification criteria, unsearchable images that represent the searchable segments are generated. For some embodiments, among others, the identified segments are converted into an unsearchable format, such as, for example, an image. Since, in reality, images can also be searched using complex algorithms, it should be appreciated that the phrase "unsearchable," within the context of this disclosure, is a relative term that indicates, for example, that the image is more difficult to search than plain ASCII text. Upon generating the image, the searchable segments of the electronic documents are substituted with the image, thereby impeding the searchability of personal information on the electronic document.

According to an exemplary embodiment, rather than converting an entire electronic document into an image, only a portion of the electronic document is reformatted. One advantage of reformatting only a portion of the electronic document is that the resulting size of the file is often relatively small, as compared to a full text-to-image conversion. In that regard, if such an approach is used to generate a web-publishable document, then the resulting web page would occupy less resources. Additionally, due to the smaller file size, such web pages would load faster by a web browser than full text-to-image-converted files. It should be appreciated that the web-publishable document may be a hypertext markup language (HTML) file, a text file, a portable document file (PDF), or any other file that is generated by a word-processing program or a web-page-authoring program.

Various exemplary embodiments are described below with reference to FIGS. 1 through 6B.

Once text has been converted into one or more images, those images become relatively difficult to edit. The disclosed systems and methods further provide a convenient approach to editing the image representations of text. As such, for some embodiments, when a user selects (e.g., double-clicks) an image representation of a text string, the corresponding text string is displayed to the user through a text editor. Once the user edits the text string, a new image is generated, which reflects the edited text string. That new image is then substituted for the original image representation of the text.

Various exemplary embodiments of systems and methods associated with such an editor are described in FIGS. 7 through 12.

Since sequential editing of image representations of text strings can, over time, generate multiple updated versions of the image, it may be difficult to track those changes, especially in a distributed computing environment. In that regard, the disclosed systems and methods also provide an approach to controlling the version of various files in a distributed computing environment. Thus, for some embodiments, version numbers are associated with a file, and each time that the file is revised or updated, that version number is updated. Hence, if a central server houses the updated file, and distributed servers house a mirror of the file, then each distributed server can maintain the most current version of a file by polling the central server under various predefined conditions. In one embodiment, among others, the polling of the central server is accomplished by a version script, which resides at each of the distributed servers.

Various exemplary embodiments of systems and methods associated with version control are described in FIGS. 13 through 17.

FIG. 1 is a block diagram showing an exemplary embodiment of a system for converting the format of a portion of a document. As shown in FIG. 1, in one embodiment, among others, the system is implemented by a personal computer 110*a* (also referred to herein as a workstation). The workstation 110*a* includes a processor 130, memory 150, a local storage device 160 (e.g., hard drive, removable floppy drive, compact disc drive, digital versatile disc drive, etc.), and a network interface 140, all communicating over a bus 170. The memory 150 typically includes the operating system (not shown), which is typically stored in non-volatile memory while the computer 110*a* is turned off, and loaded into volatile memory upon start-up, where it can be executed by the processor 130. In the present embodiment, the computer 110*a* is configured to communicate over a network, such as the Internet, through an I/O device, such as, for example, an analog modem, DSL modem, ISDN modem, ethernet card, etc., which may be connected to the computer 110*a* through the network interface 140. Since the general operation of personal computers is known in the art, further discussion of the general operation of the personal computer 110*a* is omitted here.

Figure 2:
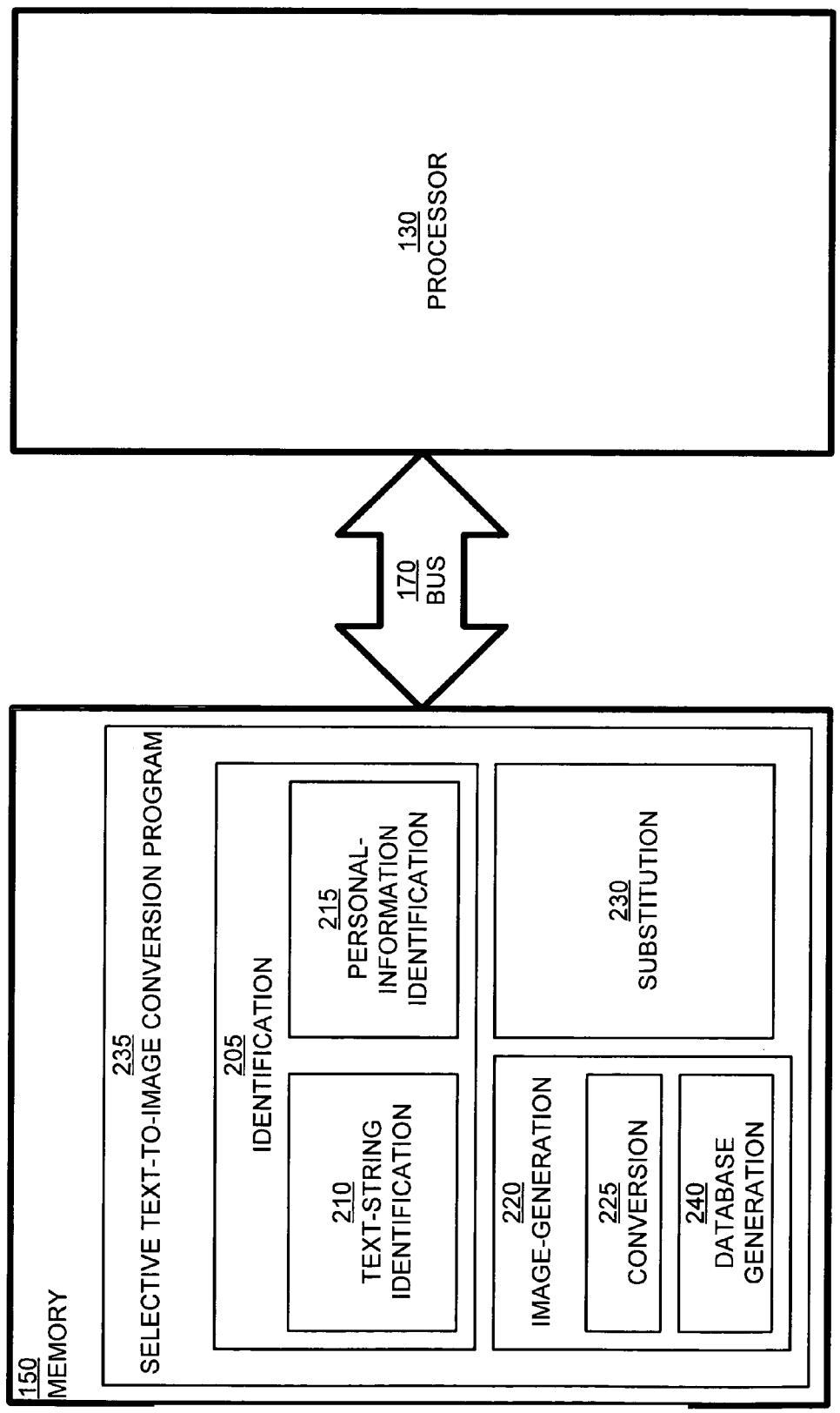
FIG. 2 is a block diagram showing components of the memory of FIG. 1, which are configured to perform the format conversion, according to an exemplary embodiment

FIG. 2 is a block diagram showing an exemplary embodiment of components of the memory 150 of FIG. 1. In the embodiment of FIG. 2, those components are configured to perform the format conversion. As shown in FIG. 2, in one embodiment, among others, the memory 150 includes a selective text-to-image conversion program 235, which is adapted to selectively reformat portions of an electronic document. Other embodiments include this conversion function incorporated into software, such as, for example, within word processing software, spreadsheet software, etc. Specifically, the selective text-to-image conversion program 235, for some embodiments, identifies searchable portions of the electronic document in accordance with various predefined identification criteria. Upon identifying the searchable portions for conversion, the selective text-to-image conversion program 235 converts, in some embodiments, the searchable portion into an unsearchable image.

Once loaded into memory 150, the selective text-to-image conversion program manifests itself as logical components within memory 150. These logical components include identification logic 205, image-generation logic 220, and substitution logic 230. Each of the logic components corresponds to a computer-readable code (e.g., a routine or a sub-routine) within the program 235. As such, the identification logic 205 is configured to identify a searchable segment of an electronic document in accordance with a predetermined identification criteria. The criteria can include, for example, a name of an individual, an email address, a social security number, a telephone number, a street address, or any other personal information associated with an individual.

In that regard, the identification logic 205 can be further segmented into text-string identification logic 210 and personal-information-identification logic 215. The text-string identification logic 210 is configured to identify a text string in accordance with predefined identification criteria. For example, a text string that represents an email address typically includes "@" between the username and the email domain. In that regard, one predefined criteria may be that a contiguous text string (i.e., a text string without interposed spaces) that includes a single "@" will be considered an email address. Similarly, a text string that represents a telephone number is typically a seven-digit number with a dash ("-") interposed between the first three digits and the last four digits of the number. Thus, another predefined criteria may be that seven-digit numbers with an interposed dash ("-") be treated as a telephone number. For those geographic locations that use ten-digit dialing, one can appreciate that the predefined criteria will indicate that ten-digit numbers with appropriate intervening dashes be treated as a telephone number. Likewise, the full name and address may also be appropriately defined. Since one of ordinary skill in the art can realize various permutations that define the identification criteria, further discussion of the identification criteria is omitted here. Suffice it to say, other sensitive information, whether personal or industrial, can also be similarly defined by various identification criteria.

In some embodiments, options can be presented to a user in an interactive manner, thereby permitting the user to identify how specific segments will be chosen for conversion. For example, a graphical prompt may be supplied to the user, which queries whether the user wishes the entire sensitive information to be converted, or whether the user wishes for only portions of the sensitive information (e.g., the "@" delimiter or the ".com" extension of an email address) to be converted.

In other embodiments, a user can manually select the searchable segments for conversion. Hence, for those embodiments, the identification criterion would be any selected text. In other words, for those embodiments, a determination of whether or not particular text has been selected would constitute one of the identification criteria.

In some embodiments, among others, the searchable text is converted into an image, which is typically not text-searchable. The image format can include, for example, a tagged image file format (TIFF), a bitmapped (BMP) format, a joint photographic experts group (JPEG) format, a graphics interchange format (GIF), or a variety of other known image formats. The image-generation logic 220 is configured to generate one or more such images. Since, in an exemplary embodiment, the image is generated by converting a text into the image, the image-generation logic 220 can be seen as including conversion logic 225, which performs the text-to-image conversion of the identified searchable segment. Since various approaches to text-to-image conversion are known in the art, further discussion of the conversion logic 225 is omitted here.

In addition to the conversion logic 225, the image-generation logic 220 can also include database generation logic 240, which is configured to generate a database that correlates the generated image with its corresponding text. It should be appreciated that, in other embodiments, the database generation logic 240 can be configured to simply provide a new entry to an existing database. The new entry would correlate the generated image with its corresponding text.

The substitution logic 230 is configured to substitute the generated image for the searchable segment, thereby producing a document in which the identified searchable segments are replaced by corresponding unsearchable images.

In operation, the processor 130 performs the corresponding function associated with each of the logical components that have been loaded into memory 150. Thus, the processor 130 retrieves the executable code from the memory via the bus 170, and executes the code to convert the searchable segments into unsearchable images.

Figure 3:
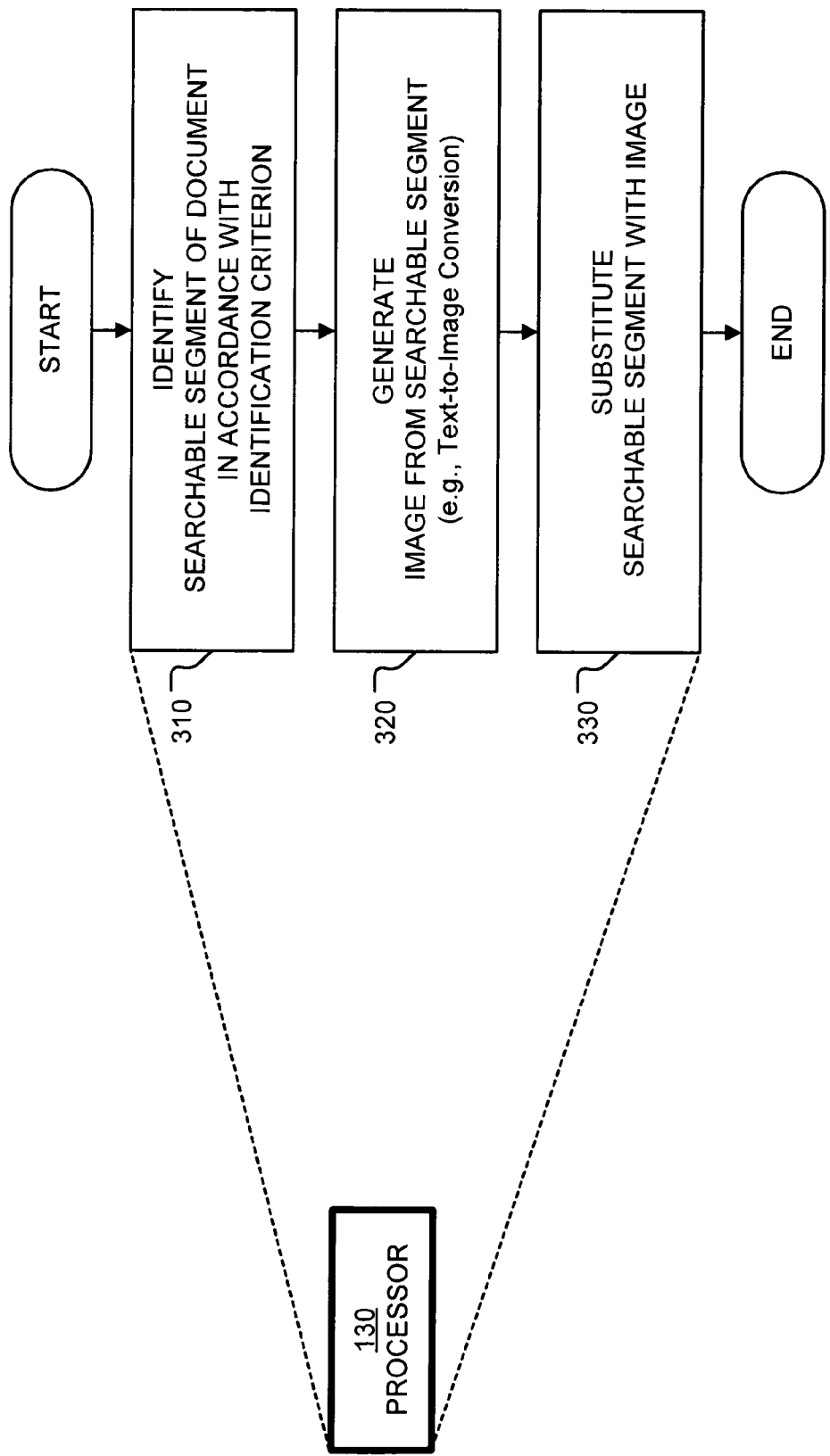
FIG. 3 is a flowchart showing an exemplary embodiment of a method for converting the format of a portion of a document.
Figure 4:
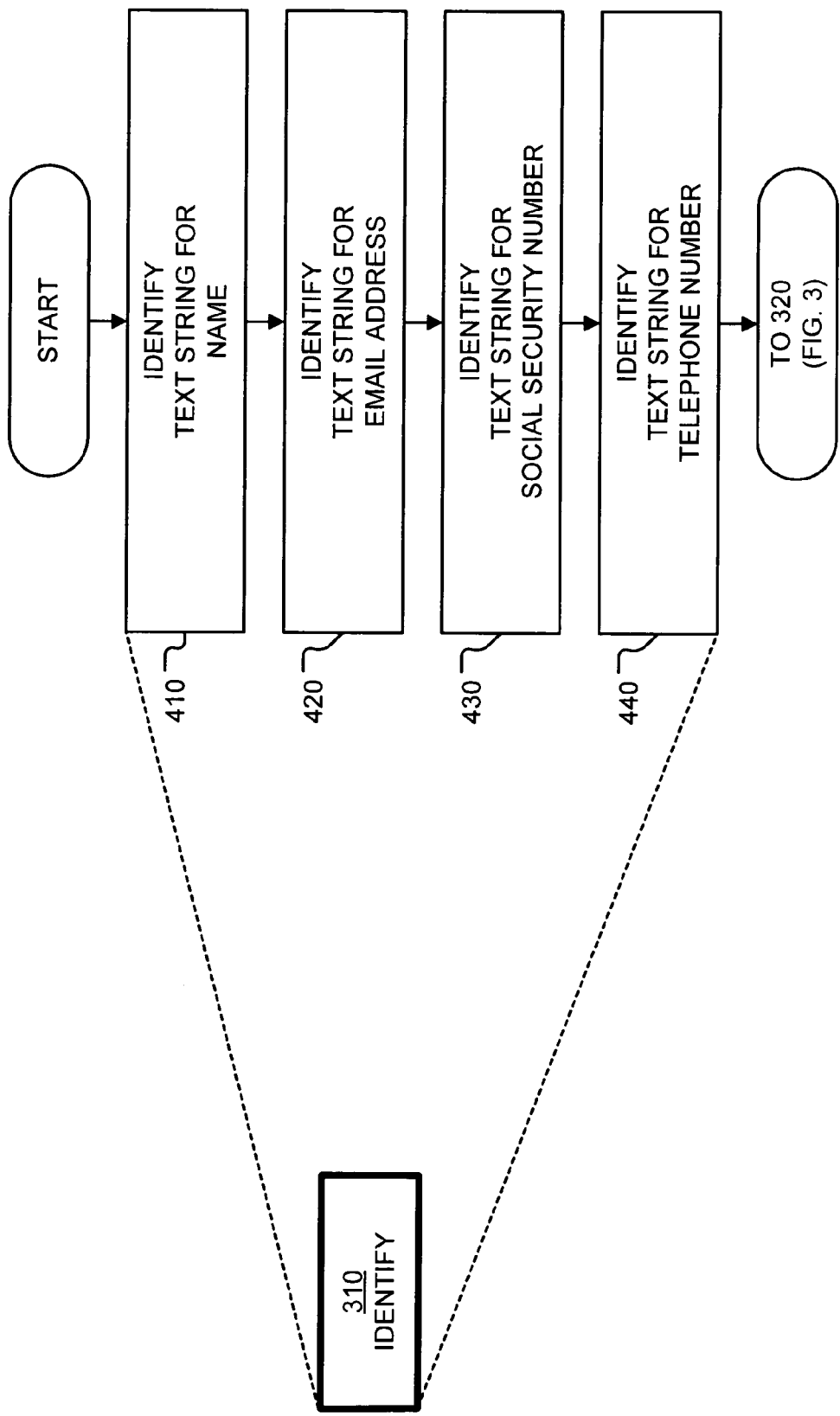
FIG. 4 is a flowchart showing, in greater detail, the step of identifying a searchable segment from FIG. 3, according to an exemplary embodiment.

Having described an exemplary embodiment of a system for reformatting a portion of an electronic document, attention is turned to FIGS. 3 through 5, which show various embodiments of methods for reformatting a portion of an electronic document.

As shown in FIG. 3, in one embodiment, among others, the process begins by identifying (310) a searchable segment of a document. The searchable segment of the document can be identified (310) in accordance with an identification criterion. The identification criterion can be a name, an email address, a social security number, a telephone number, or other personal information that is associated with an individual. Upon identifying the searchable segment, the process continues by generating (320) an image from the searchable segment. The image is an unsearchable representation of the searchable segment. Upon generating (320) the image, the searchable segment is substituted with the unsearchable image (330). In that regard, the resulting electronic document hinders the harvesting of sensitive information.

FIG. 4 is a flowchart showing, in greater detail, the step of identifying (310) the searchable segment. As shown in FIG. 4, one embodiment, among others, of the identifying step (310) can be seen as including the steps of identifying (410) a text string for an individual's name; identifying (420) a text string for an individual's email address; identifying (430) a text string for an individual's social security number; and identifying (440) a text string for an individual's telephone number. As discussed above, with reference to FIG. 2, each of the identified text strings may have predefined characteristics. For example, an email address is typically a contiguous text string having a single interposed "@" within the text string. Similarly, a social security number is a nine-digit number having interposed dashes ("-"). These, and other desired criteria, can be used to specify the appropriate text strings for identification.

Having described embodiments of methods for reformatting portions of an electronic document, attention is turned to FIGS. 5 through 6B, which show examples of conversions of electronic documents.

FIG. 5 illustrates an exemplary embodiment of a web page that is rendered with sensitive information included in searchable text. While the source code for the rendered web page is not specifically shown, the source code for such a page should be readily discernable by those having skill in the art. In the embodiment of FIG. 5, the sensitive information includes a name 510 ("Bob Smith"), a telephone number 520 ("(404) 555-1234"), an email address 530 ("bsmith@bob.smith.com"), and a street address 540 ("123 Peachtree Street, Atlanta, Ga. 30303"). As shown in FIG. 5, the sensitive information is displayed as searchable text. Hence, a would-be spammer can easily harvest the sensitive information from the web page of FIG. 5 by employing an appropriately programmed bot. It should be appreciated that other information on the web page can be identified as sensitive information. As noted above, a user may manually select the sensitive information for conversion, as one of the predefined identification criteria.

FIG. 6A illustrates an embodiment of the web page of FIG. 5, which has been rendered with the sensitive information reformatted into an unsearchable format. As shown in FIG. 6A, the text "Bob Smith" 510 has been converted to an image representation 610 of the text. Similarly, the text "bsmith@bob.smith.com" has been converted to an image 630 that represents that email address. Likewise, both the texts "(404) 555-1234" and "123 Peachtree Street, Atlanta, Ga. 30303" have been converted to their corresponding image representations 620, 640. In that regard, the sensitive information would now be largely undetectable by a text-string search.

FIG. 6B illustrates another embodiment of the web page of FIG. 5, which has been rendered with the sensitive information reformatted into an unsearchable format. Unlike FIG. 6A, in which the entire name, street address, telephone number, and email address have been converted into their respective images, the embodiment of FIG. 6B shows only portions of the various information being converted into images. For example, rather than converting the entire text string "bsmith@bob.smith.com" into an image 630, only the username portion and the delineator ("bsmith@") is converted into an image 632. The partial conversion of the information is sufficient to effectively impede the harvesting of the information. For example, if "b Sm" 612a is converted into an image, rather than converting the entire name, a text-string search will result in the uncovering of "Bo" and "ith," which, in the absence of other factors, effectively provide no sensitive information.

As shown from FIGS. 1 through 6B, by converting searchable segments into unsearchable images, the disclosed systems and methods impede the harvesting of sensitive information by spammers and other Internet delinquents. Also, by converting only a portion of a document, rather than converting the entire document, much bandwidth and storage space is conserved.

FIGS. 7 through 12 show other exemplary embodiments of systems and methods, in which converted images can be more easily edited than by using conventional techniques. Once text has been converted into one or more images, those images become relatively difficult to edit. The disclosed systems and methods further provide a convenient approach to editing the image representations of text. As such, for some embodiments, when a user selects (e.g., double-click) an image representation of a text string, the corresponding text string is displayed to the user through a text editor. Once the user edits the text string, a new image is generated, which reflects the edited text string. That new image is then substituted for the original image representation of the text.

Figure 7:
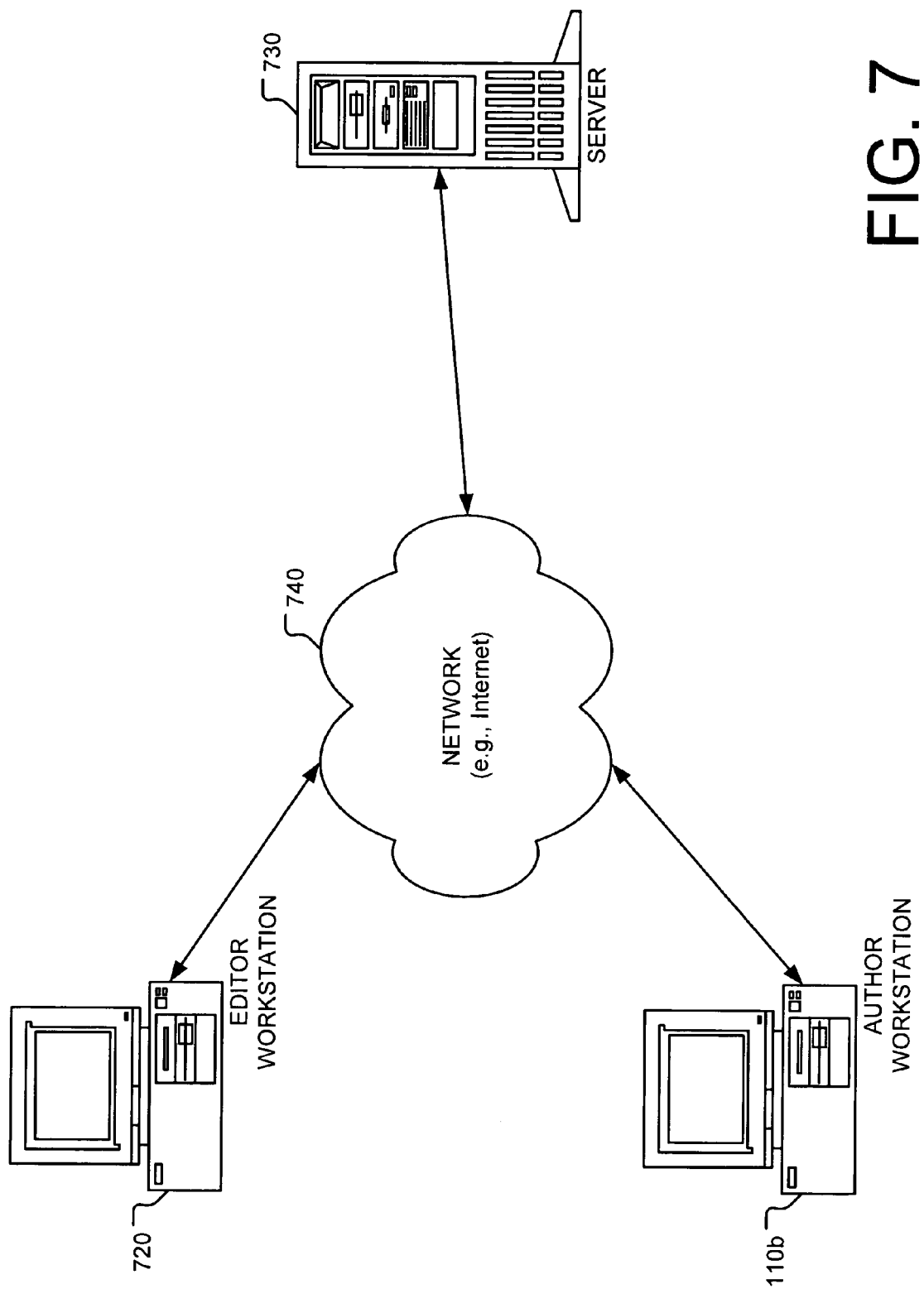
FIG. 7 is a block diagram showing an exemplary embodiment of a client-based system for editing an image representation of a text.

FIG. 7 is a block diagram showing a portion of a network configuration in an exemplary embodiment of a client-based system for editing an image representation of a text. As shown in FIG. 7, one embodiment, among others, comprises a network 740 (e.g., the Internet), a server 730, an author workstation 110b, and an editor workstation 720. The server 730, the author workstation 110b, and the editor workstation 720 are configured to communicate over the network 740. In that regard, information can be exchanged between the editor workstation 720 and the author workstation 110b in a variety of known manners. Similarly, both workstations 720, 110b can exchange information with the server 730 using similar known network-communication protocols. Similar to the workstation described above, the author workstation 110b of FIG. 7 is configured to receive input from a user and convert a portion of a text document into an image. Since that conversion process is described above, further discussion of the conversion process is omitted here. Once a document having the image is created, that document is uploaded to the server 730 from the author workstation 110b using known techniques. In some embodiments, those techniques can include file transfer protocol (FTP) or other similar approaches.

Once the document is stored on the server 730, it can be accessed by a variety of clients that are connected to the server 730, such as, for example, the editor workstation 720. Thus, when the editor workstation 720 downloads the document from the server 730, the contents of that document can be displayed to a user at the editor workstation 720. In addition to displaying the contents of the electronic document, the editor workstation 720 is configured to permit the user to edit the electronic document. Specifically, in some embodiments, among others, the editor workstation 720 facilitates editing of images that represent text, as originally generated by the author workstation 110b. This is shown in greater detail with reference to FIG. 8. Since it may be desirable to provide access to editing capabilities to authorized personnel, preferably, for some embodiments, an authorization mechanism can be implemented to permit only certain workstations access to edit the electronic document. Since various authorization mechanisms are known in the art, further discussion of such mechanisms is omitted here. However, it should be appreciated by one having ordinary skill in the art that known authorization mechanisms can be implemented in conjunction with the processes described herein. Furthermore, it should be appreciated that custom authorization mechanisms may also be developed for use with the disclosed systems and methods.

Figure 8:
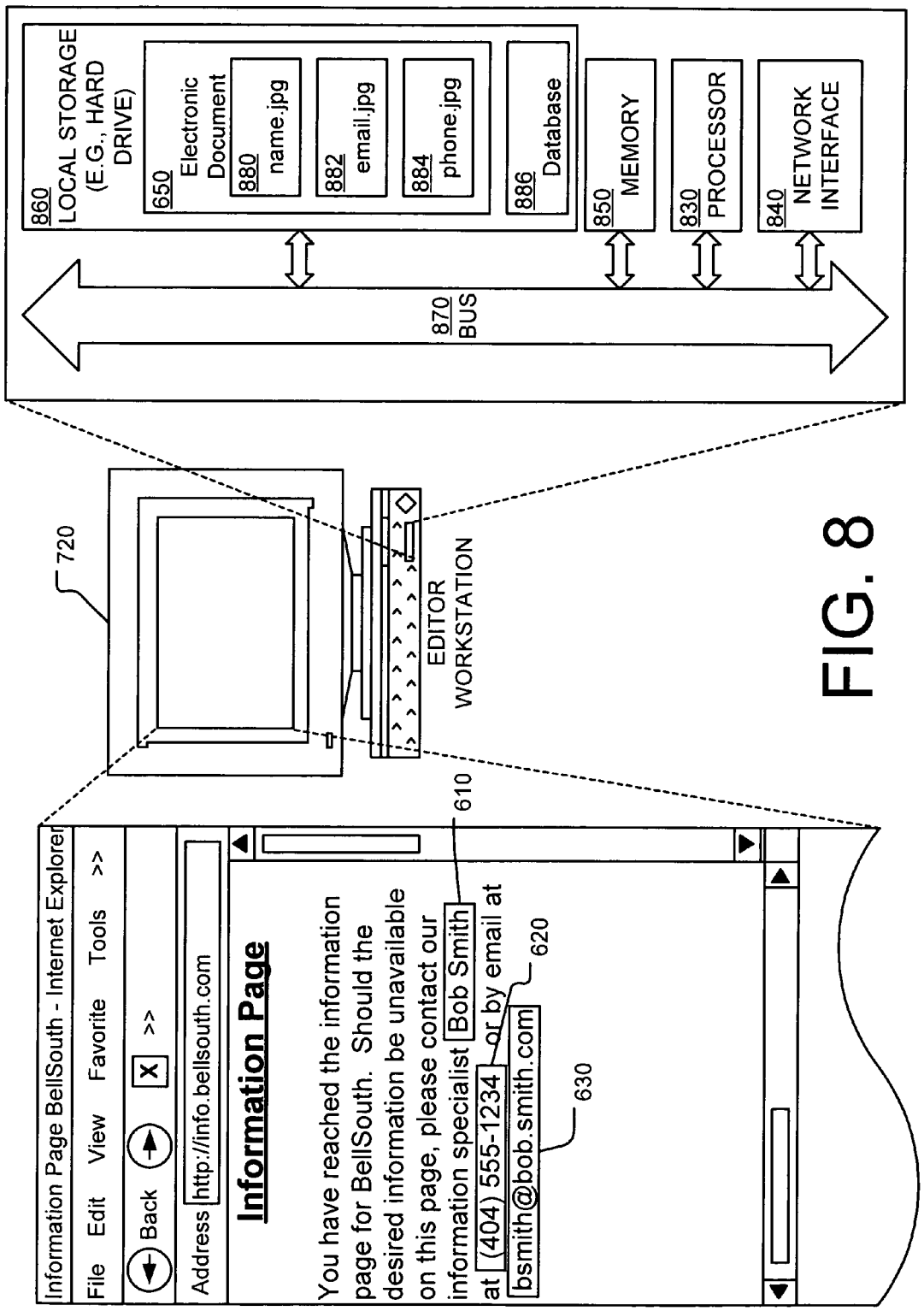
FIG. 8 is a block diagram showing an exemplary embodiment of the editor workstation of FIG. 7.

FIG. 8 is a block diagram showing an exemplary embodiment of the editor workstation 720 of FIG. 7. As shown in FIG. 8, the editor workstation 720 comprises a memory 850, a processor 830, a network interface 840, and a local storage 860, all of which are communicatively coupled over a bus 870. Thus, once the electronic document 650 has been downloaded from the server 730, that document 650 is typically stored on the local storage unit 860. In the embodiment of FIG. 8, the electronic document 650 includes an image representation of sensitive information, such as, for example, an image representation of a name 880, an image representation of an email address 882, and an image representation of a telephone number 884. In addition to the electronic document 880, the editor workstation 720 downloads a database 886, which correlates the images with their corresponding texts. It should also be appreciated that the database 886 can be emailed to a potential editor-recipient, rather than having the editor download the database 886. In that regard, the author can control those individuals that have the ability to edit the electronic document. For example, in some embodiments that do not include server-based management of a database, the database 886 is automatically created by the authoring conversion function as a similarly named companion file, such as with a ".dat" extension, so that the author is able to transfer directly to selected recipients the converted electronic document with or without the companion database file, thus selectively enabling or not enabling the recipients to edit the converted electronic document utilizing the database 886.

In the example of FIG. 8, the image representation of the name 880 corresponds to "Bob Smith" 610, the image representation of the email address 882 corresponds to "bsmith@bob.smith.com" 630, and the image representation of the telephone number 884 corresponds to "(404) 555-1234." Thus, when a user downloads and displays the electronic document 650, as shown in FIG. 8, specific portions of the document are displayed as images 610, 620, 630.

When the user at the editor workstation 720 wishes to edit the contents of the images, the user simply selects the image by, for example, double-clicking on that image. Once selected, the editor workstation 720 is configured to open a text editor having the text that corresponds to the selected image. For example, if the user selects the image "Bob Smith" 610 from FIG. 8, then the text editor will display ASCII text "Bob Smith" for the user to edit. Exemplary logical components associated with the editing process are shown in FIG. 9.

Figure 9:
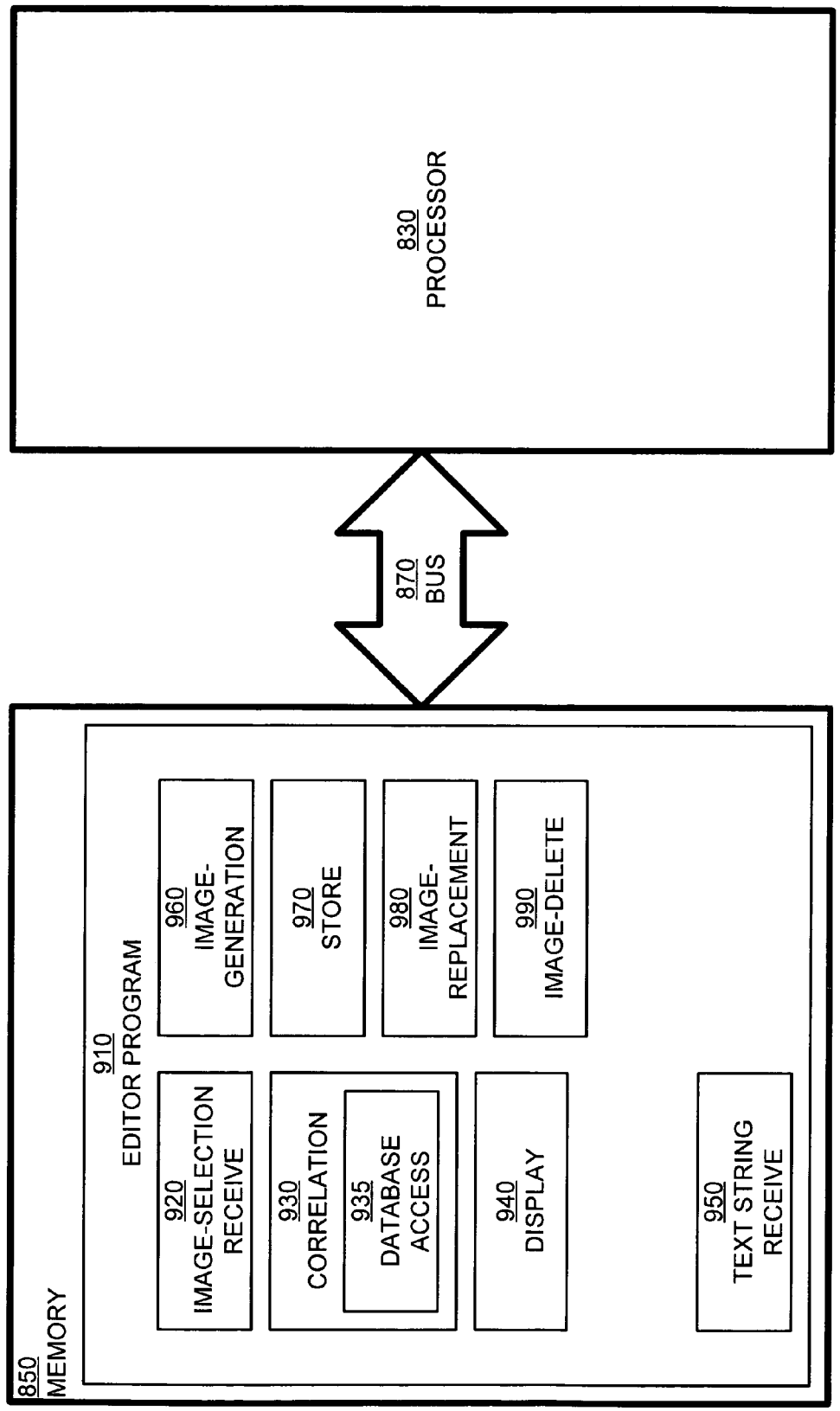
FIG. 9 is a block diagram showing an exemplary embodiment of components of the memory of FIG. 8.

FIG. 9 is a block diagram showing an exemplary embodiment of components of the memory of FIG. 8, which permit a user to edit text that corresponds to an image. As shown in FIG. 9, the editing process is performed by an editor program 910, which is stored in memory 850 for execution by the processor 830. The editor program 910 comprises image-selection receive logic 920, correlation logic 930 including database access logic 935, display logic 940, text-string receive logic 950, image-generation logic 960, store logic 970, image-replacement logic 980, and image-delete logic 990.

The image-selection receive logic 920 is configured to receive input from the user. That input is indicative of an image selected by the user. For example, if the user double-clicks on "Bob Smith" 610 of FIG. 8, then the image-selection receive logic 920 receives input that indicates that the user selected the "Bob Smith" 610 image.

The correlation logic 930, which includes the database access logic 935, is configured to correlate the selected image with a particular text. The correlation information is stored in the database 886. Thus, once the image has been selected, the database access logic 935 accesses the database 886 in order to correlate the selected image with its corresponding text. For example, if the "Bob Smith" 610 image is selected, then the correlation logic 930 returns the ASCII text "Bob Smith."

The display logic 940 displays the returned ASCII text "Bob Smith" to the user in a text editor. Since text editors are known in the art, further discussion of text editors is omitted here. The user can, thereafter, edit the displayed text and prompt the editor workstation 720 to save the edited text. For example, if "Bob Smith" is edited to "Joe Jones," then the new text "Joe Jones" will be saved in response to the prompt from the user.

The text-string receive logic 950 is configured to receive the edited text string. In the above example, the text-string receive logic 950 receives the text string of "Joe Jones." The image-generation logic 960 is configured to generate an image that corresponds to the edited text string. The image can be generated in accordance with those approaches discussed above. In this example, the generated image would be an image representation of "Joe Jones." The store logic 970 is configured to store the generated image at a local database on the editor workstation 720. A remote storage configuration is described below, with reference to FIG. 12.

The image-replacement logic 980 is configured to replace the original image with the newly generated image. Thus, for this example, the original image of "Bob Smith" would be replaced by the new image of "Joe Jones." The image-delete logic 990 is configured to delete the original image. Thus, in this example, the "Bob Smith" image would be deleted by the image-delete logic 990.

Figure 10:
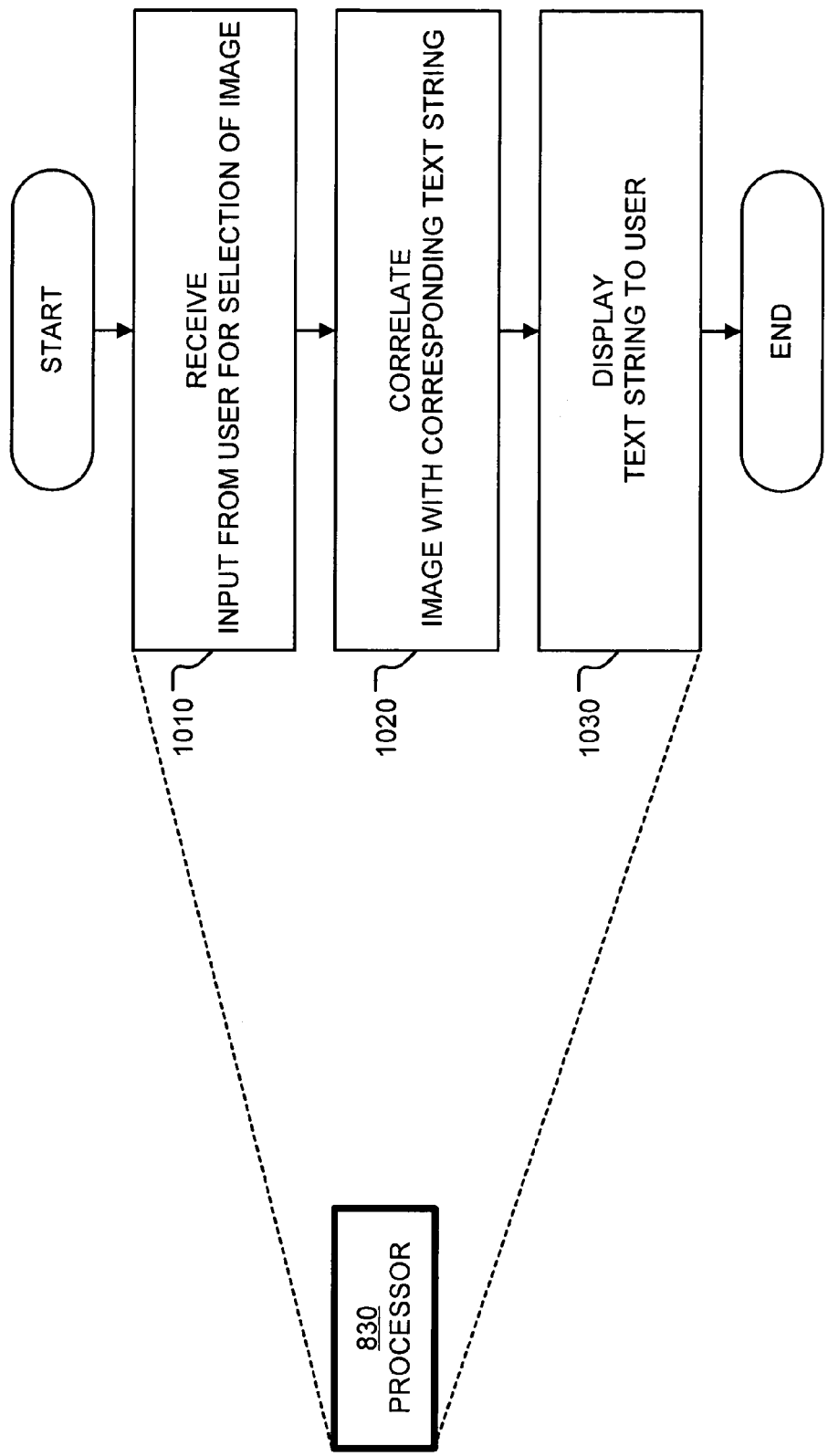
FIG. 10 is a flowchart showing an exemplary embodiment of a method for editing an image representation of a text.
Figure 11:
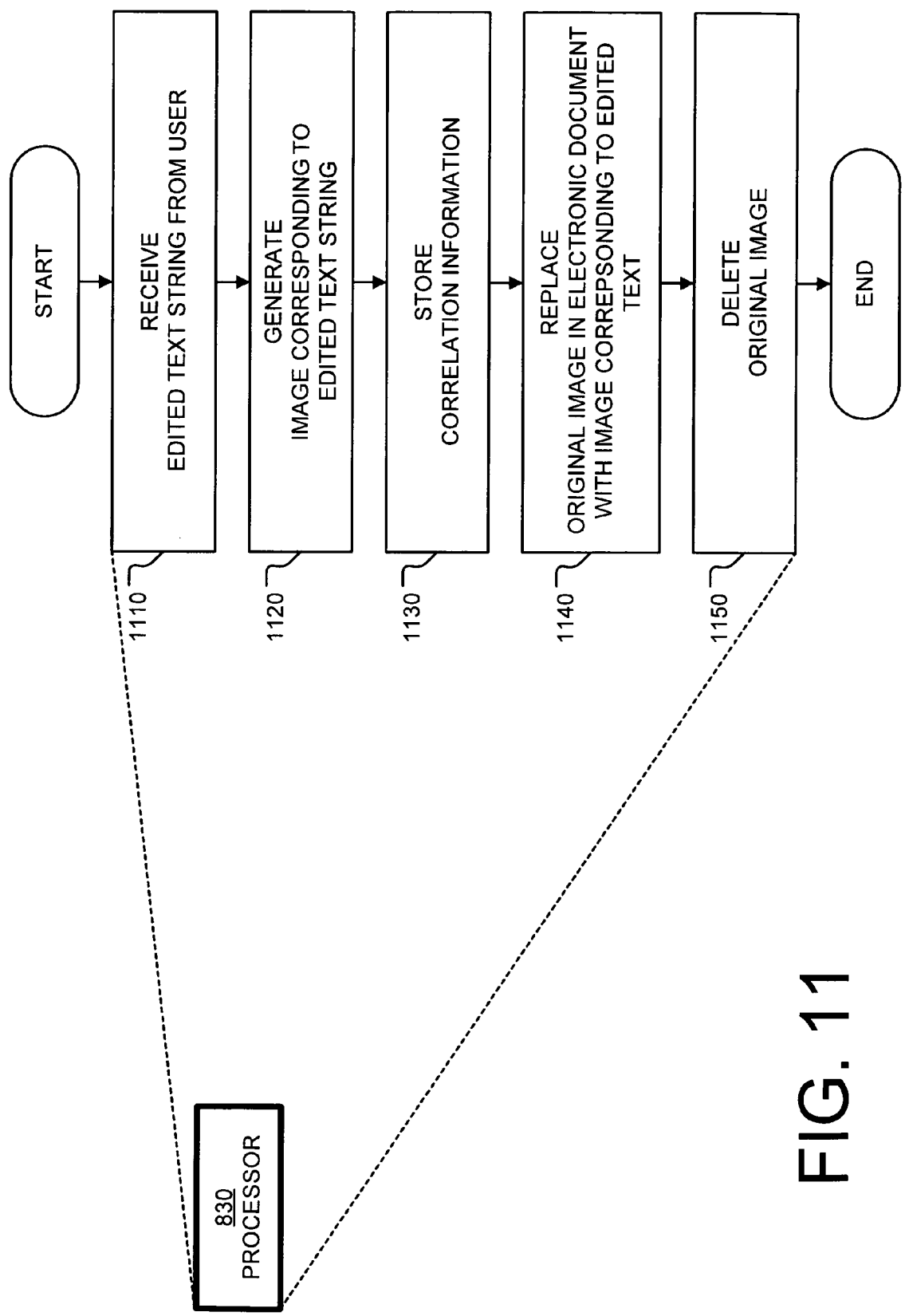
FIG. 11 is a flowchart showing another exemplary embodiment of a method for editing an image representation of a text.

Some embodiments, among others, of processes that can be performed by the logic components are shown with reference to FIGS. 10 and 11. It should be appreciated by those of skill in the art that other components could be used to perform the processes of FIGS. 10 and 11.

FIG. 10 is a flowchart showing an exemplary embodiment of a method for editing an image representation of a text. As shown in FIG. 10, one embodiment, among others, begins when input is received (1010) from a user. The input represents a selection of an image, such as, for example, the image representation of "bsmith@bob.smith.com" 630. Upon receiving (1010) the input, the process correlates (1020) the image with its corresponding text string. Thus, if the image representation of "bsmith@bob.smith.com" is selected, then the corresponding text string "bsmith@bob.smith.com" is correlated (1020) to the selected image. Upon correlating the text string to the image, the text string is displayed (1030) to the user.

When the user edits the text string, then that information is used to update the contents of the electronic document as well as the contents of the database. In some embodiments, rather than simply updating the contents of the database, the editor can create a wholly separate database that reflects the changes made by the editor. An exemplary embodiment of one process, among others, is shown in FIG. 11. Specifically, in that example, the text string "bsmith@bob.smith.com" is edited to "jjones@joe.jones.com".

Once the user has edited the original text string, the new text string is received (1110) from the user. Using the new text string, the processor 830 generates (1120) an image that corresponds to the new text string. Thus, in this example, an image representation of "jjones@joe.jones.com" is generated (1120) by the processor. The generated image, along with the information that correlates the image to the text, is stored (1130). Thereafter, the original image "bsmith@bob.smith.com" is replaced (1140) with the new image "jjones@joe.jones.com", and the original image "bsmith@bob.smith.com" is deleted (1150).

It should be appreciated that, for embodiments in which only a portion of the sensitive information has been converted, a separate identifier or key can be assigned to the image. Thus, using an example of an email address, that identifier or key identifies whether the entire email address has been converted to an image, whether the "@" delimiter has been converted to an image, whether the ".com" extension has been converted to an image, etc.

As seen from the embodiments of FIGS. 10 and 11, a convenient method is disclosed, which permits editing of image representations of text strings.

Figure 12:
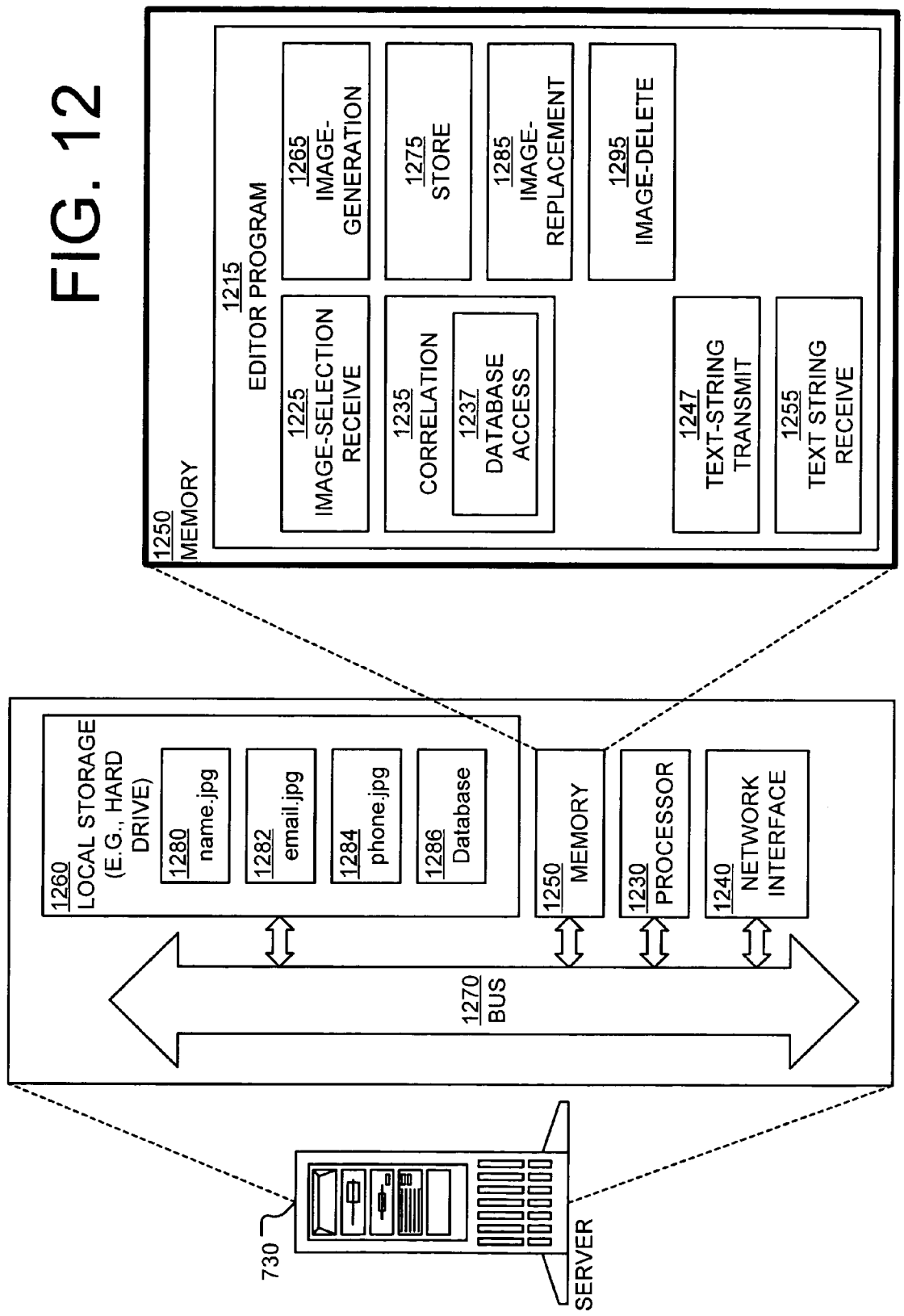
FIG. 12 is a block diagram showing an exemplary embodiment of a server-based system for editing an image representation of a text.

FIG. 12 is a block diagram showing an exemplary embodiment of a server-based system for editing an image representation of a text. As such, FIG. 12 shows server-side components that are analogous to the client-side components of FIG. 8. As shown in FIG. 12, the editing process is performed by an editor program 1215, which is stored in memory 1250 for execution by the processor 1230. The editor program 1215 comprises image-selection receive logic 1225, correlation logic 1235 including database access logic 1237, display logic 1245, text-string transmit logic 1247, text-string receive logic 1255, image-generation logic 1265, store logic 1275, image-replacement logic 1285, and image-delete logic 1295.

The image-selection receive logic 1225 is configured to receive input over the network. That input is indicative of an image selected by the user at a client. For example, if the user double-clicks on "Bob Smith" 610 of FIG. 8 from a client machine, then the image-selection receive logic 1225 receives that input over the network.

The correlation logic 1235, which includes the database access logic 1237, is configured to correlate the selected image with a particular text. The correlation information is stored in the database 1286. Thus, once the image has been selected, the database access logic 1237 accesses the database 1286 in order to correlate the selected image with its corresponding text. For example, if the "Bob Smith" 610 image is selected, then the correlation logic 1235 returns the ASCII text "Bob Smith."

The text-string transmit logic 1247 transmits the ASCII text "Bob Smith" from the server to the client-side machine. The client-side machine displays the returned ASCII text "Bob Smith" to the user in a text editor. Since text editors are known in the art, further discussion of text editors is omitted here. The user can, thereafter, edit the displayed text and prompt the client-side machine (e.g., editor workstation 720) to save the edited text. For example, if "Bob Smith" is edited to "Joe Jones," then the new text "Joe Jones" will be saved in response to the prompt from the user.

The text-string receive logic 1277 is configured to receive the edited text string from the client-side machine over the network. In the above example, the text-string receive logic 1275 receives the text string of "Joe Jones." The image-generation logic 1265 is configured to generate an image that corresponds to the edited text string. The image can be generated in accordance with those approaches discussed above. In this example, the generated image would be an image representation of "Joe Jones." The store logic 1275 is configured to store the generated image at a database on the server 730. In this regard, the embodiment of FIG. 12 shows a remote storage and editing configuration, while the embodiment of FIG. 9 shows a local storage and editing configuration.

The image-replacement logic 1285 is configured to replace the original image at the server with the newly generated image. Thus, for this example, the original image of "Bob Smith" would be replaced by the new image of "Joe Jones." The image-delete logic 1295 is configured to delete the original image. Thus, in this example, the "Bob Smith" image would be deleted by the image-delete logic 1295.

Similar to the embodiment of FIG. 9, the embodiment of FIG. 12 facilitates editing of image representations of text strings. However, unlike FIG. 9, the embodiment of FIG. 12 permits remote editing of files. As one can see, for remote editing of files, it is possible that multiple differing copies of files can exist in various locations on the network. In some instances, it may be desirable to coordinate all of those existing copies so that the availability of incorrect or outdated information is minimized. One approach, among others, to coordinating the existing copies is provided in FIGS. 13 through 17.

FIGS. 13 through 17 show other embodiments that can exist in a distributed server environment. For such environments, when files are edited, the latest version of files is virtually synchronized across all servers in order to ensure consistency across servers. Since sequential editing of image representations of text strings can, over time, generate multiple updated versions of the image, it may be difficult to track those changes, especially in a distributed computing environment. In that regard, the disclosed systems and methods also provide an approach to controlling the version of various files in a distributed computing environment. Thus, for some embodiments, version numbers are associated with a file, and each time that the file is revised or updated, that version number is updated. Hence, if a central server houses the updated file, and distributed servers house a mirror of the file, then each distributed server can maintain the most current version of a file by polling the central server under various predefined conditions. In one embodiment, among others, the polling of the central server is accomplished by a version script, which resides at each of the distributed servers.

Figure 13:
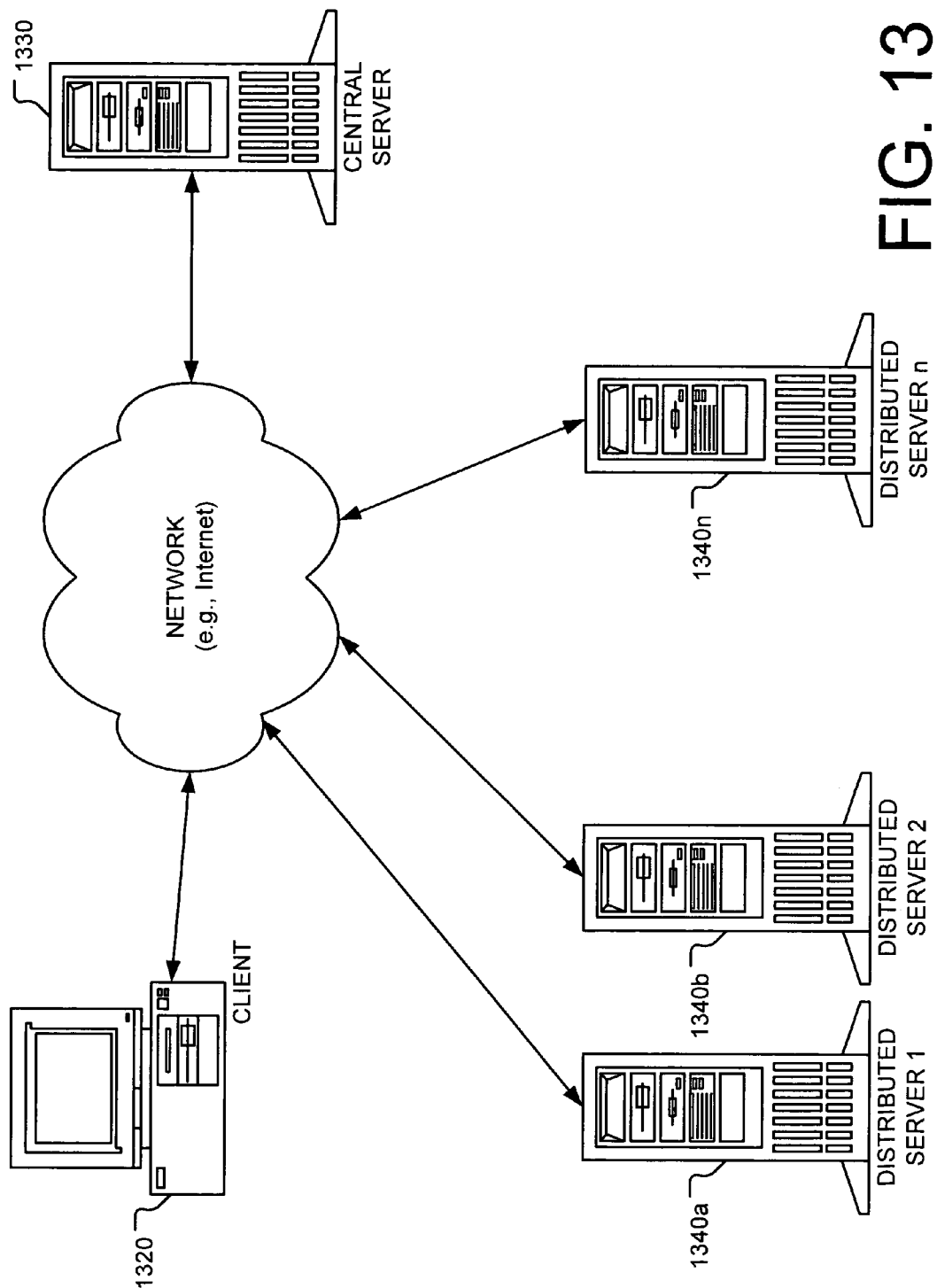
FIG. 13 is a block diagram showing an exemplary embodiment of a system for controlling software versions in a distributed computing environment.

FIG. 13 is a block diagram showing a distributed server environment for an exemplary embodiment of a system for controlling software versions. As shown in FIG. 13, one embodiment, among others, of a distributed server environment comprises a network, such as the Internet, through which various devices can communicate. Specifically, FIG. 13 shows a central server 1330 and a variety of other distributed servers 1340a . . . 1340n (hereinafter collectively referred to as "distributed servers 1340") coupled to the network. In addition to the plurality of distributed servers 1340, a client machine 1320 (or simply "client") is also coupled to the network, thereby permitting communication between the client 1320 and the variety of servers 1330, 1340. Such an environment exists for high-traffic systems, in which duplicate servers are used to accommodate various client requests. For such environments, the individual distributed servers 1340 are accessed in a round-robin fashion to alleviate bottle-necking due to heavy network traffic. The round-robin access scheme is typically controlled by routers. Since these and other schemes are known in the art, further discussion of such schemes, in the context of distributed server environments, is omitted here.

The central server 1330 stores the most recent contents of the electronic document and is, therefore, used to synchronize the contents of the distributed servers 1340. For example, as discussed above, it may be possible that each of the distributed servers 1340 contains a different version of a file. In other words, unless the contents of all servers are synchronized, it is possible that outdated or obsolete files can be provided to a client, depending on the server that is accessed by the client.

Thus, in one embodiment, among others, the client 1320 requests an electronic document from one of the distributed servers 1340n. The distributed server 1340n, upon receiving the request, queries the central server 1330 to ensure that the contents on the distributed server 1340n match the contents of the central server 1330. Greater details on the systems and methods for such processes are discussed with reference to FIGS. 14 through 17.

Figure 14:
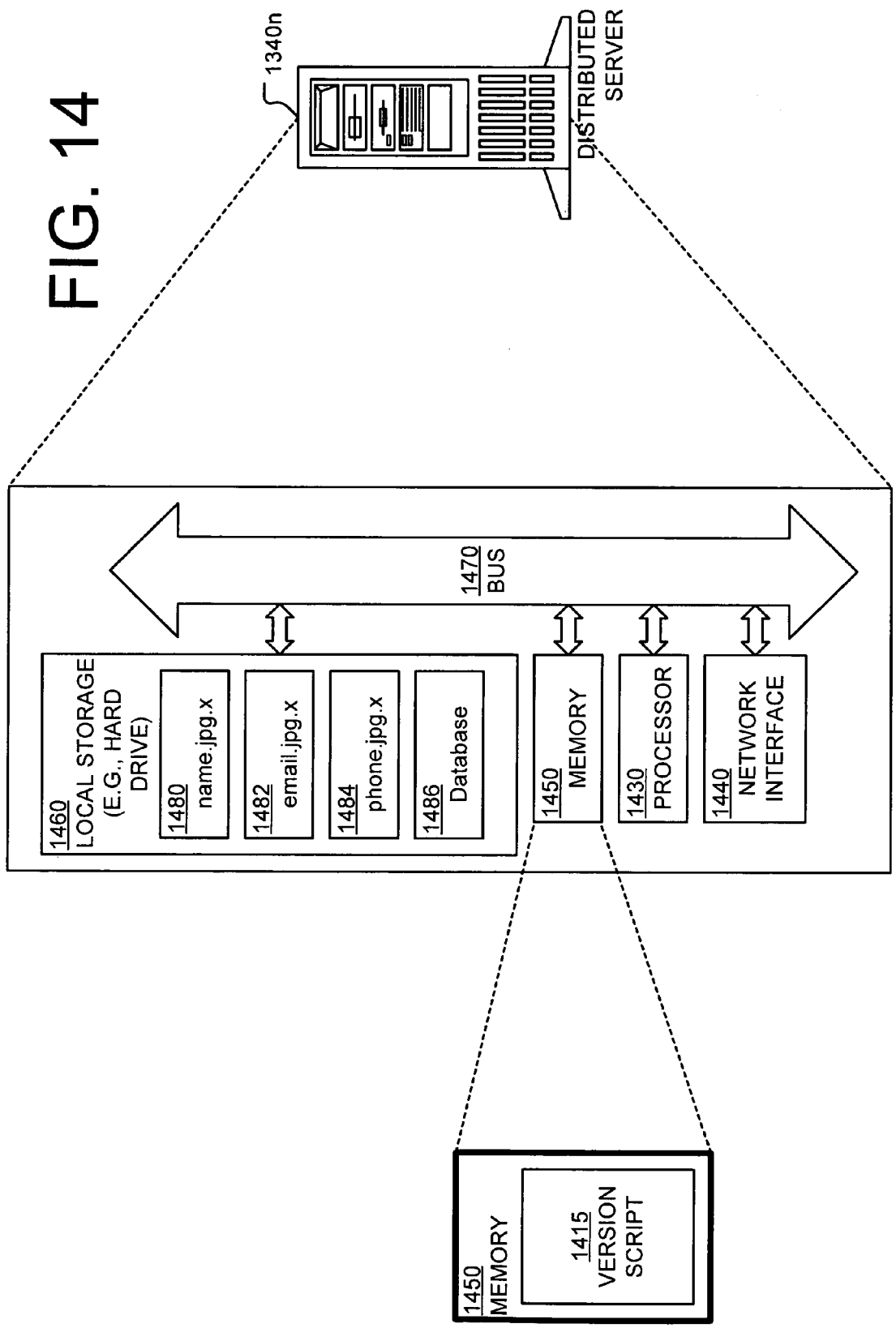
FIG. 14 is a block diagram showing an exemplary embodiment of a version script that is located on one of the servers in the distributed computing environment of FIG. 13.

FIG. 14 is a block diagram showing an exemplary embodiment of a version script 1415 that is located on one of the servers 1340n in the distributed computing environment of FIG. 13. As shown in FIG. 14, a distributed server 1340n comprises a local storage unit 1460 (e.g., a hard drive), which contains image representations of sensitive information, such as, for example, a name 1480, an email address 1482, and a telephone number 1484. Additionally, the local storage unit 1340n contains a database 1486 that correlates each of the image files 1480, 1482, 1484 with their respective text strings. As shown in FIG. 14, each file 1480, 1482, 1484 comprises a name portion (shown as "name.jpg," "email.jpg," and "phone.jpg") and a version number portion (shown as "x"). In addition to the local storage unit 1460, the distributed server 1340n includes memory 1450, a processor 1430, and a network interface 1440, which are all communicatively coupled to each other through a bus 1470. Specifically, FIG. 14 shows the version script 1415 loaded into memory 1450 and ready for execution by the processor 1430.

Figure 15:
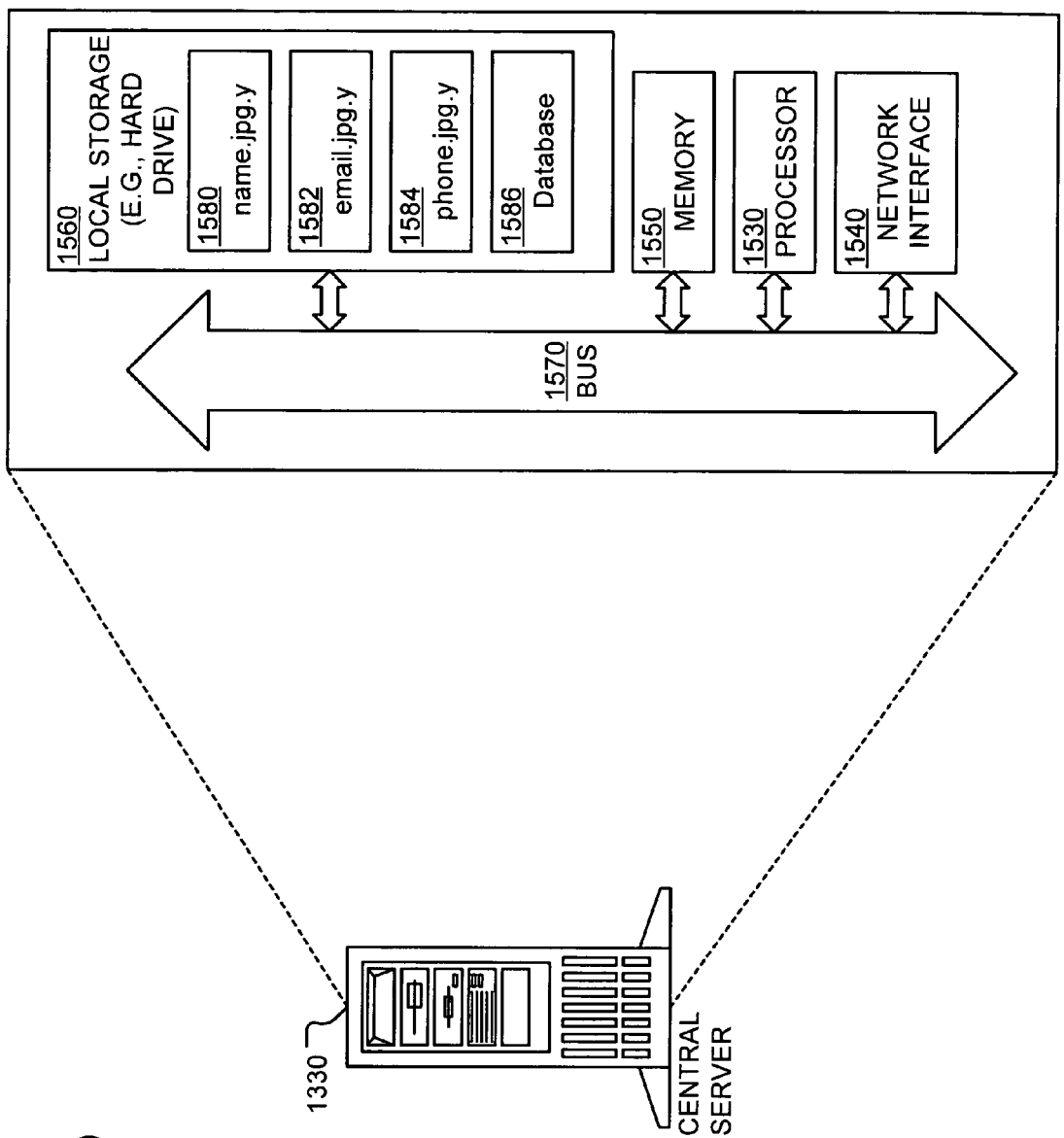
FIG. 15 is a block diagram showing an exemplary embodiment of the central server of FIG. 13.

FIG. 15 is a block diagram showing an exemplary embodiment of the central server 1330 of FIG. 13. Similar to the distributed server 1340n of FIG. 14, the central server 1330 of FIG. 15 includes a local storage unit 1560, memory 1550, a processor, and a network interface 1540, which are communicatively coupled to each other through a local bus 1570. The local storage unit 1560 contains image representations of text strings, such as, for example "name.jpg.y" 1580, "email.jpg.y" 1582, and "phone.jpg.y" 1584. In addition to these image files, the local storage unit 1560 also contains a database 1586 that correlates the image files 1580, 1582, 1584 to their corresponding text strings.

As shown in FIG. 15, each of the image files 1580, 1582, 1584 has a name portion that is substantially identical to the name portion of the image files 1480, 1482, 1484 on the distributed server 1340n. However, unlike the image files 1480, 1482, 1484 on the distributed server 1340n, the image files 1580, 1582, 1584 on the central server may have a different version number portion (shown as "y").

It should be appreciated that, in some embodiments, the files on the central server are not directly editable by others having access through the distributed servers 1340. The reason being that such direct access can, in some instances, result in undesired tampering of files on the central server. Thus, in exemplary embodiments, only those having permission, as identified by a systems administrator, to access the central server would be able to edit the files on the central server. In other embodiments, however, those files on the central server can also be configured to be accessible by others.

Figure 16:
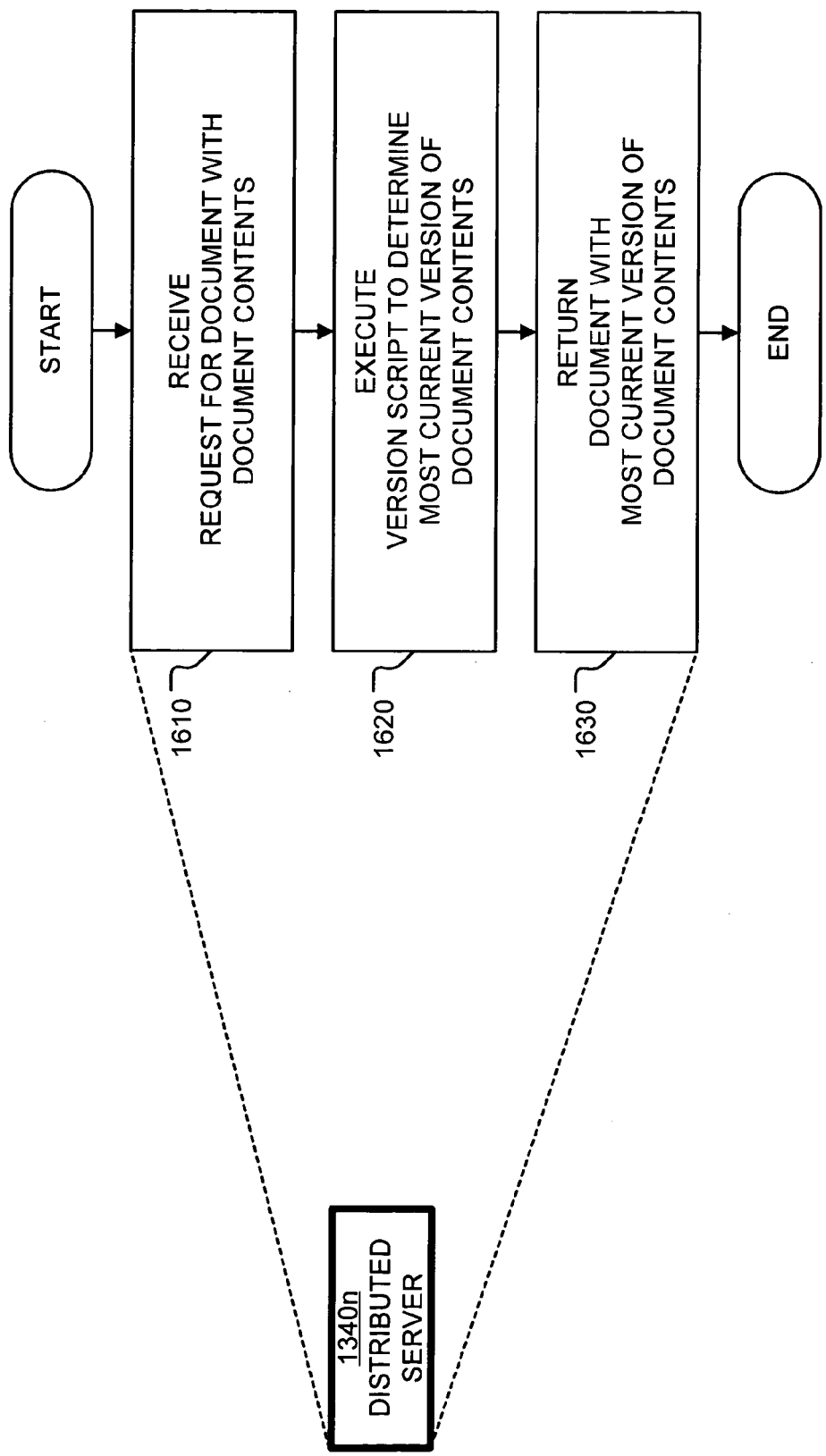
FIG. 16 is a flowchart showing an exemplary embodiment of a method for controlling software versions in a distributed computing environment.

The version number of the image files 1580, 1582, 1584 on the central server 1330 represent the most current version of the files. Thus, if the distributed server 1340*n* has been updated to contain the most current version of the image files, then the version number portion ("x") on the distributed server 1340*n* will match the version number portion ("y") on the central server 1330. FIGS. 16 and 17 illustrate several exemplary embodiments in which the distributed server 1340*n* checks the central server 1330 and updates its contents accordingly.

It should be appreciated that, for some embodiments, not all images files are correlated to an original sensitive text. For example, a hyper-text markup language (HTML) web-page may include original images that were not the result of a conversion. For those images, there would be no correlative text. Thus, in some embodiments, another identifier may be supplied, which labels the images to identify whether the image originated from a text, or whether the image is an original image that is not the result of a conversion. Consequently, for some embodiments, only those converted images may be easily editable, as described herein.

FIG. 16 is a flowchart showing an exemplary embodiment of a method for controlling software versions in a distributed computing environment. Specifically, FIG. 16 shows a process that is executed by the distributed server 1340*n* when a request for a document is received from a client. For example, the process of FIG. 16 can occur when a client requests a web page from the distributed server 1340*n*. As such, in one embodiment of the process, the distributed server 1340*n* receives (1610) a request for a document, including the document contents. If the document is a web page, then all of the corresponding images and embedded files would be the document contents. Upon receiving (1610) the request, the distributed server 1340*n* executes (1620) a version script 1415, such as that shown in FIG. 14, to determine whether or not the distributed server 1340*n* has the most current version of the contents. Further details on the version script 1415 are provided with reference to FIG. 17. After executing (1620) the version script 1415, the distributed server 1340*n* returns (1630) the requested document with the most current versions of the document contents.

FIG. 17 is a flowchart showing, in greater detail, the execution of the version script 1415 from FIG. 16, according to an exemplary embodiment. As shown in FIG. 17, one embodiment, among others, of the version script 1415 begins by retrieving (1705) a local document content. For example, the document content may be the image representation of a name, an email address, or a telephone number, such as those shown in FIG. 14. For purposes of illustration, in FIG. 17, the first document content is the file "name.jpg.x" 1480. Upon retrieving (1705) "name.jpg.x" 1480, the version script 1415 determines (1710) the version number for the file. In this example, the version number is "x." Upon determining (1710) the version number for "name.jpg.x," the version script queries (1715) the central server 1330 for the version number of the corresponding content on the central server 1330. In this example, the query would return the value "y," since the corresponding file at the central server is labeled "name.jpg.y." The version script 1415 then determines (1720) whether the version number of the local document content (i.e., "x" in this example) is the same as the version number of the central server content (i.e., "y" in this example).

If the version numbers match, then the version script 1415 sets (1740) the local document content as the most current version. Thereafter, the version script 1415 determines whether or not all of the document contents have been checked for the most current version. If all of the contents have been checked, then the process ends. If all of the contents have not been checked, then the version script 1415 retrieves (1705) the next document content, and the process repeats. For example, once the "name.jpg.x" has been checked for the most current version, the version script 1415 checks "email.jpg.x." Thereafter, "phone.jpg.x" would be checked, and any other contents that are associated with the requested document.

If the version number of the local document content is determined (1720) to be different from the version number of the content on the central server 1330, then the version script 1415 requests (1725) updated content from the central server 1330. When the central server provides the updated content, the distributed server 1340*n* receives (1730) the updated content. The updated content is then set (1735) as the local document content. In other words, for some embodiments, the local document content is replaced by the updated content from the central server 1330. Thereafter, the local document content (which is now the updated document content) is set (1740) as the most current version of the content. The version script 1415 then determines whether or not all document contents have been checked against the contents of the central server 1330.

In the specific example of FIGS. 14 and 15, presuming that none of the contents on the distributed server 1340*n* are current, the files "name.jpg.x" 1480, "email.jpg.x" 1482, and "phone.jpg.x" 1484 would be replaced by "name.jpg.y" 1580, "email.jpg.y" 1582, and "phone.jpg.y" 1584 from the central server 1330. Thereafter, those updated files would be returned to the client that originally requested the electronic document and all of its contents.

As shown in the embodiments of FIGS. 14 through 17, each of the distributed servers 1340 can stay current by checking their contents against the contents of the central server 1330. In that regard, rather than pushing any updates to a large number of distributed servers 1340, the contents of all of the distributed servers can be updated by simply updating the contents at the central server 1330. Also, since only the versions of various files are being checked, rather than downloading the entire contents of the electronic document at each request, bandwidth is conserved and network traffic is reduced. Also, since only those outdated or obsolete files are retrieved from the central server 1330, rather than retrieving all files, less bandwidth is occupied when compared to systems that download complete contents at each request. Furthermore, since each distributed server 1340 queries the central server 1330 in response to requests from clients, bottlenecks associated with synchronized downloading are reduced. In other words, unlike other approaches in which all of the distributed servers are synchronized concurrently by the central server 1330 (also referred to as a "pushing data" from the central server 1330), the query approach (also referred to as "pulling data" by the distributed servers 1340) temporally distributes the use of network bandwidth.

According to exemplary embodiments, the identification logic 205, the text-string identification logic 210, the personal-information-identification logic 215, the image-generation logic 220, the conversion logic 225, the substitution logic 230, the image-selection receive logic 920, 1225, the correlation logic 930, 1235, the database access logic 935, 1237, the display logic 940, 1245, text-string transmit logic 945, 1247, the text-string receive logic 950, 1255, the image-generation logic 960, 1265, the store logic 970, 1275, the image-replacement logic 980, 1285, and the image-delete logic 990, 1295 can be implemented in hardware, software, firmware, or a combination thereof. According to exemplary embodiment(s), the identification logic 205, the text-string identification logic 210, the personal-information-identification logic 215, the image-generation logic 220, the conversion logic 225, the substitution logic 230, the image-selection receive logic 920, 1225, the correlation logic 930, 1235, the database access logic 935, 1237, the display logic 940, 1245, text-string transmit logic 945, 1247, the text-string receive logic 950, 1255, the image-generation logic 960, 1265, the store logic 970, 1275, the image-replacement logic 980, 1285, and the image-delete logic 990, 1295 are implemented in software or firmware that is stored in a memory and that is executed by a suitable instruction execution system.

If implemented in hardware, as in an alternative embodiment, the identification logic 205, the text-string identification logic 210, the personal-information-identification logic 215, the image-generation logic 220, the conversion logic 225, the substitution logic 230, the image-selection receive logic 920, 1225, the correlation logic 930, 1235, the database access logic 935, 1237, the display logic 940, 1245, text-string transmit logic 945, 1247, the text-string receive logic 950, 1255, the image-generation logic 960, 1265, the store logic 970, 1275, the image-replacement logic 980, 1285, and the image-delete logic 990, 1295 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The selective text-to-image conversion program 235, the editor program 910, 1215, and the version script 1415, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, or store the program for use by or in connection with the instruction execution system, apparatus, or device.

Although exemplary embodiments have been shown and described, it will be clear to those of ordinary skill in the art that a number of changes, modifications, or alterations to the invention as described may be made. For example, while a personal computer 110a is shown as an example embodiment of a system, it should be appreciated that the system can be implemented using other programmable devices, such as, for example, a personal digital assistant (PDA), an Internet-capable cellular telephone, etc.

Additionally, while some embodiments show localized processing of the various functions, those having skilled in the art will appreciate that the various functions can be provided in a distributed environment in which various servers provide the disclosed functions. In that regard, it should be appreciated that, rather than being a program residing on a single computer, other embodiments contemplate a client-server architecture in which various subroutines or code segments reside at a server and are accessed by clients that generate requests for those subroutines. Since client-server environments are known in the art, further discussion of client-server environments is omitted here.

Also, for some embodiments, it should be appreciated that, rather than directly providing a substantially unsearchable image, the substantially unsearchable image can be indirectly provided by placing a universal resource locator (URL) for the image within the document. In that regard, the images can be stored in a web-accessible repository, and the electronic document can include the URL or link to the document in the web-accessible repository. It should be appreciated that the correlation database and/or storage of images could exist at separate locations from the web pages themselves that reference those images. For such embodiments, the remote access can be provided as a service, which can be charged to the user on a per-use basis or other commercial basis. This service can be similar to known banner advertising server mechanisms, which generate advertisements based upon a particular user address identifiers (e.g., Internet protocol (IP) address). Preferably, a one-to-one relationship can be implemented, in which a particular user address identifier is linked with a particular image. Thus, for example, should an administrator at a particular IP address wish to change an image that is linked to a URL, that administrator can automatically be charged a nominal fee in exchange for the convenience of a web-based mechanism for altering that server-side image.

Moreover, for some embodiments, the text can be replaced with an inline "IMG" tag in hypertext markup language (HTML), which references an image that shows the text of the image in the same format as the original basic text. For those embodiments, the image conversion mechanism can also be configured to track text format, size, font, and other text characteristics so that the image seamlessly appears as text within the electronic document. Thus, for those embodiments, should the text of an electronic document be changed, then corresponding changes to the images will take place throughout the document. In that regard, the editor can be further configured to adaptively recognize and adapt the images automatically, in response to various changes within the electronic document.

All such changes, modifications, and alterations should therefore be seen as within the scope of the disclosure.

What is claimed is:

1. A computer implemented system comprising:

a local file having a local file identifier, the local file including an image section and a text section, the image section having been inserted in place of a portion, that is less than all, of searchable text, the searchable text having previously been determined to be searchable text of sensitive information, the image section being a substantially unsearchable representation of the portion of the sensitive searchable text, the image section including a user-selectable image section, wherein, upon selection of the user selectable image section, corresponding text is displayed to a user for editing, the local file identifier comprising a name portion, the local file identifier further comprising a version number portion;

access logic configured to access a master file, the master file having a master file identifier, the master file identifier comprising a name portion, the master file identifier further comprising a version number portion, the name portion of the master file identifier being substantially identical to the name portion of the local file identifier; and compare logic configured to compare the version number portion of the local file identifier with the version number portion of the master file identifier;

retrieve logic configured to retrieve the master file in response to determining that the version number portion of the local file identifier is different from the version number portion of the master file identifier;

replace logic configured to replace the local file with the master file;

input logic configured to receive a user input indicating a selection of an unsearchable image included in the replaced master file;

first conversion logic configured to convert selected unsearchable image into a textual format;

receive logic configured to receive at least one user edit to the textually formatted image; and second conversion logic configured to convert the edited textually formatted image from the textual format into an unsearchable image format.

2. The system of claim 1, wherein the master file is accessed from a central server, the central server being located remotely from the local file.

3. The system of claim 1, further comprising:
requests receive logic configured to receive a requests from a requestor, the requests including the name portion.

4. The system of claim 3, further comprising:
convey logic configured to convey the local file to the requestor, the local file being conveyed in response to determining that the version number portion of the local file identifier is the same as the version number portion of the master file identifier.

5. The system of claim 1, wherein the replace logic comprises:
store logic configured to store the master file; and
delete logic configured to delete the local file.

6. The system of claim 1, wherein the convey logic comprises:
requests issue logic configured to issue a requests for the master file; and
file receive logic configured to receive the master file in response to issuing the requests.

7. A computer implemented method comprising:
accessing a local file, the local file including an image section and a text section, the image section having been inserted in place of a portion, that is less than all, of searchable text that has been previously determined to be searchable text of sensitive information, the image being a substantially unsearchable representation of the portion of the sensitive searchable text, the image section including a user-selectable image section, wherein, upon selection of the user selectable image section, corresponding text is displayed to a user for editing, the local file having a local file identifier, the local file identifier comprising a name portion, the local file identifier further comprising a version number portion;

accessing a master file, the master file having a master file identifier, the master file identifier comprising a name portion, the master file identifier further comprising a version number portion, the name portion of the master file identifier being substantially identical to the name portion of the local file identifier; and comparing the version number portion of the local file identifier with the version number portion of the master file identifier;

retrieving the master file in response to determining that the version number portion of the local file identifier is different from the version number portion of the master file identifier;

replacing the local file with the master file;

receiving a user input indicating a selection of an image included in the replaced master file;

converting the selected image into a textual format;

receiving at least one user edit to the textually formatted image; and converting the edited textually formatted image from the textual format into an unsearchable image format.

8. The method of claim 7, further comprising:
receiving a requests from a requestor, the requests including the name portion; and
wherein accessing the local file is responsive to receiving the requests for the file.

9. The method of claim 8, further comprising:
conveying the local file to the requestor, the local file being conveyed to the requestor in response to determining that the version number portion of the local file identifier is the same as the version number portion of the master file identifier.

10. The method of claim 8, further comprising:
retrieving the master file in response to determining that the version number portion of the local file identifier is different from the version number portion of the master file identifier;
replacing the local file with the master file; and
conveying the master file to the requestor.

11. The method of claim 10, wherein replacing the local file with the master file comprises:
storing the master file; and
deleting the local file.

12. The method of claim 10, wherein retrieving the master file comprises:
issuing a requests for the master file; and
receiving the master file in response to issuing the requests.

13. A computer-readable medium that stores a program that, when executed by a computer, causes the computer to perform at least the following:
access a local file, the local file including an image section and a text section, the image section having been inserted in place of a portion, that is less than all, of searchable text that has been previously determined to be searchable text of sensitive information, the image being a substantially unsearchable representation of the portion of the sensitive searchable text, the image section including a user-selectable image portion, wherein, upon selection of the user selectable image section, corresponding text is displayed to a user for editing, the local file having a local file identifier, the local file identifier comprising a name portion, the local file identifier further comprising a version number portion;

access a master file, the master file having a master file identifier, the master file identifier comprising a name portion, the master file identifier further comprising a version number portion, the name portion of the master file identifier being substantially identical to the name portion of the local file identifier; and compare the version number portion of the local file identifier with the version number portion of the master file identifier;

retrieve the master file in response to determining that the version number portion of the local file identifier is different from the version number portion of the master file identifier;

replace the local file with the master file;

receive a user input indicating a selection of an image included in the replaced master file;

convert selected image into a format;

receive at least one user edit to the textually formatted image; and convert the edited textually formatted image from the textual format into an unsearchable image format.

14. The computer-readable medium of claim 13, the program further causing the computer to perform at least the following:

receive a requests from a requestor, the requests including the name portion.

15. The computer-readable medium of claim 14, the program further causing the computer to perform at least the following:

convey the local file to the requestor, the local file being conveyed in response to determining that the version number portion of the local file identifier is the same as the version number portion of the master file identifier.

16. The computer-readable medium of claim 14, the program further causing the computer to perform at least the following:

retrieve the master file in response to determining that the version number portion of the local file identifier is different from the version number portion of the master file identifier;

replace the local file with the master file; and convey the master file to the requestor.

17. The computer-readable medium of claim 14, further comprising:

means for retrieving the master file in response to determining that the version number portion of the local file identifier is different from the version number portion of the master file identifier;

means for replacing the local file with the master file; and means for conveying the master file to the requestor.

18. The computer-readable medium of claim 16, the program further causing the computer to perform at least the following:

store the master file; and delete the local file.

19. The computer-readable medium of claim 16, the program further causing the computer to perform at least the following:

issue a requests for the master file; and receive the master file in response to issuing the requests.

20. The computer-readable medium of claim 13, the program further causing the computer to perform at least the following:

provide the converted unsearchable image for display.

* * * * *